United States Patent
Liu et al.

(10) Patent No.: US 11,996,938 B2
(45) Date of Patent: May 28, 2024

(54) Encoder selection

(71) Applicant: QUALCOMM Incorporated, San Diego, CA (US)

(72) Inventors: Guangyi Liu, Shanghai (CN); Gabi Sarkis, San Diego, CA (US); Shuanshuan Wu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 81 days.

(21) Appl. No.: 17/898,221

(22) Filed: Aug. 29, 2022

(65) Prior Publication Data

US 2024/0072930 A1    Feb. 29, 2024

(51) Int. Cl.
   *H04L 1/00*  (2006.01)

(52) U.S. Cl.
   CPC .......... *H04L 1/0057* (2013.01); *H04L 1/0041* (2013.01)

(58) Field of Classification Search
   CPC ... H04L 1/0041; H04L 1/0057; H04L 1/0076; H04L 1/189; H04L 1/1812; H04L 1/1887; H04W 72/02; H04W 72/40; H04W 72/121
   See application file for complete search history.

(56) References Cited

U.S. PATENT DOCUMENTS

| | | |
|---|---|---|
| 2008/0056174 A1 | 3/2008 | Jung et al. |
| 2011/0134828 A1 | 6/2011 | Osseiran et al. |
| 2015/0195033 A1 | 7/2015 | Maric et al. |
| 2021/0136731 A1* | 5/2021 | Li ............... H04W 24/10 |
| 2023/0069615 A1* | 3/2023 | Hu ............... H04W 72/121 |
| 2023/0072709 A1* | 3/2023 | Liu ............... H04L 1/1812 |

OTHER PUBLICATIONS

Ericsson: "Aspects for SL Relay Selection and Reselection", 3GPP TSG-RAN WG2 #113bis-e, R2-2103001, 3rd Generation Partnership Project, Mobile Competence Centre, 650, Route Des Lucioles, F-06921 Sophia-Antipolis Cedex, France, vol. RAN WG2, No. Electronic meeting, Apr. 12, 2021-Apr. 20, 2021, Apr. 1, 2021, 4 Pages, XP051991986, p. 1-p. 2.

International Search Report and Written Opinion—PCT/US2023/030276—ISA/EPO—Dec. 6, 2023.

* cited by examiner

*Primary Examiner* — Shelly A Chase

(74) *Attorney, Agent, or Firm* — Procopio, Cory, Hargreaves & Savitch LLP

(57) ABSTRACT

Apparatus, methods, and computer program products for selecting an encoder for network coding are provided. An example method may include transmitting a report request for reporting one or more conditions to one or more network coding devices, the one or more conditions being associated with the one or more network coding devices. The example method may further include receiving a condition report reporting the one or more conditions from the one or more network coding devices based on the report request. The example method may further include transmitting a selection indication to a selected network coding device of the one or more network coding devices, the selection indication indicating a selection of the selected network coding device as an encoder for encoding a transport block (TB).

30 Claims, 12 Drawing Sheets

Encoder selection

TECHNICAL FIELD

The present disclosure relates generally to communication systems, and more particularly, to wireless communication systems with network coding (NC).

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus at a network node (such as a network entity or a network coding device) are provided. The apparatus may include a memory and at least one processor coupled to the memory. The memory and the at least one processor coupled to the memory may be configured to transmit a report request for reporting one or more conditions to one or more network coding devices, the one or more conditions being associated with the one or more network coding devices. The memory and the at least one processor coupled to the memory may be further configured to receive a condition report reporting the one or more conditions from the one or more network coding devices based on the report request. The memory and the at least one processor coupled to the memory may be further configured to transmit a selection indication to a selected network coding device of the one or more network coding devices, the selection indication indicating a selection of the selected network coding device as an encoder for encoding a transport block (TB).

In another aspect of the disclosure, a method, a computer-readable medium, and an apparatus at a network coding device (such as a road-side unit (RSU), a base station, or a user equipment (UE) are provided. The apparatus may include a memory and at least one processor coupled to the memory. The memory and the at least one processor coupled to the memory may be configured to receive a report request for reporting one or more conditions from a network node, the one or more conditions being associated with the network coding device. The memory and the at least one processor coupled to the memory may be further configured to transmit a condition report reporting the one or more conditions to the network node based on the report request. The memory and the at least one processor coupled to the memory may be further configured to receive a selection indication from the network node, the selection indication indicating a selection of the network coding device as an encoder for encoding a transport block (TB).

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
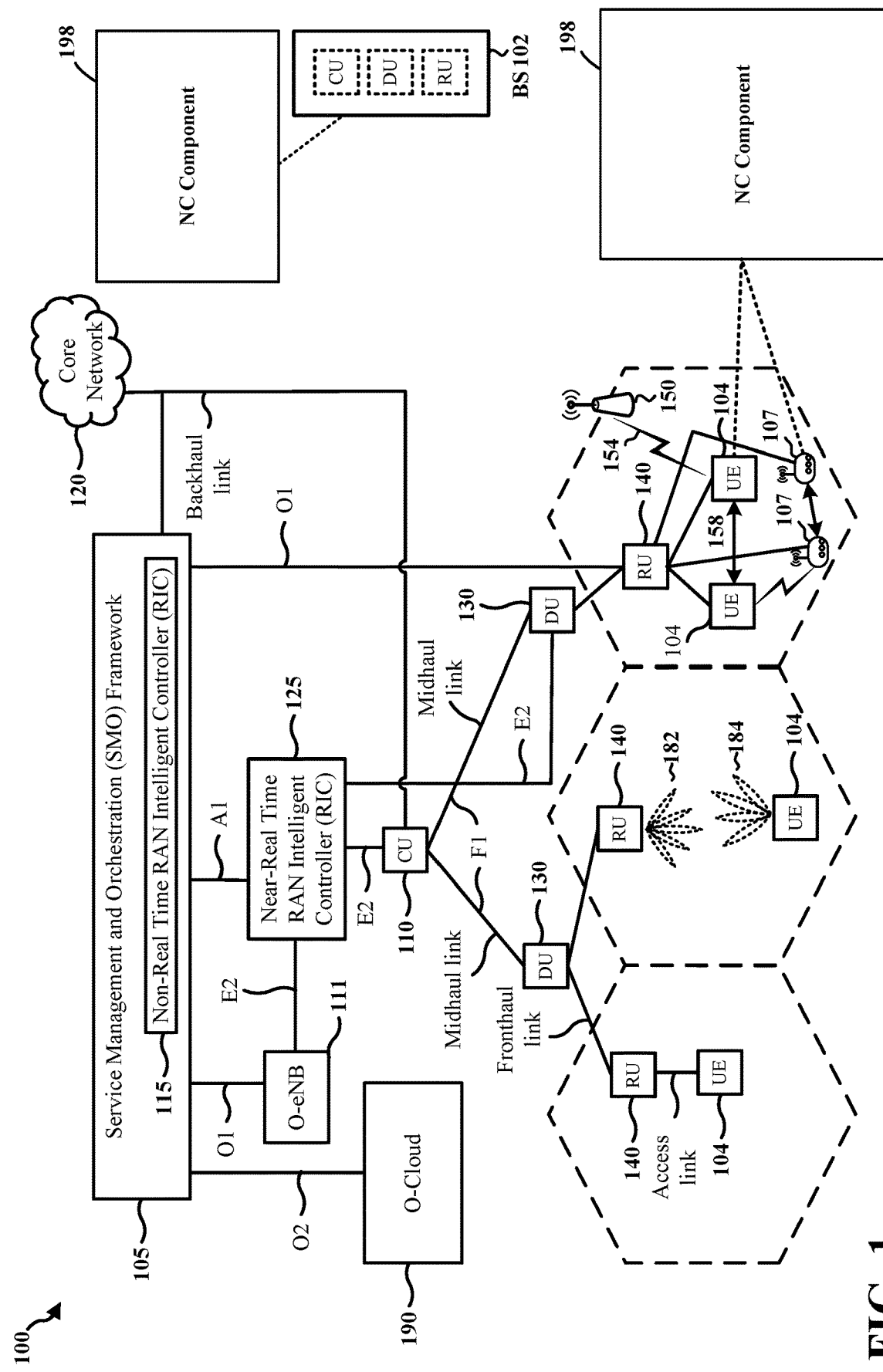
FIG. 1 is a diagram illustrating an example of a wireless communications system and an access network.

Network coding may be used to increase system capacity and improve resource utilization. For example, network coding may be used for reducing the number of retransmissions in the system. Network coding may enable an increase in the number of UEs or in traffic per UE while maintaining performance. Network coding may be performed by network coding devices, such as RSUs, UEs, or base stations, based on network coding requests from devices. In some circumstances, instead of having one central network coding device responsible for perform network coding in an area, it may be beneficial to have multiple network coding device in the area to more efficiently perform network coding. However, among the network coding devices that may potentially perform network coding in the area, in some situations, a subset of the network coding devices may be more suitable for performing network coding due to having more power, more unused capability, less mobility and a longer duration of staying within the area, or the like. Aspects provided herein may enable a network coding device or a network entity to select a subset of network coding devices from a pool of network coding devices in an area as an encoder for transport blocks (TBs) for network coding.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor (s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit—User Plane (CU-UP)), control plane functionality (i.e., Central Unit—Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualize d network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190)

to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/MIL models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to YIMHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR. The D2D communication link 158 may be used for sidelink communication between the UEs 104.

Some examples of sidelink communication may include vehicle-based communication devices that can communicate from vehicle-to-vehicle (V2V), vehicle-to-infrastructure (V2I) (e.g., from the vehicle-based communication device to road infrastructure nodes such as a road-side-unit (RSU)), vehicle-to-network (V2N) (e.g., from the vehicle-based communication device to one or more network nodes, such as a base station), vehicle-to-pedestrian (V2P), cellular vehicle-to-everything (C-V2X), and/or a combination thereof and/or with other devices, which can be collectively referred to as vehicle-to-anything (V2X) communications. Sidelink communication may be based on V2X or other D2D communication, such as Proximity Services (ProSe), etc. In addition to UEs, sidelink communication may also be transmitted and received by other transmitting and receiving devices, such as one or more RSUs 107, etc. Sidelink communication may be exchanged using a sidelink interface. In some aspects, one or more RSUs 107 may communicate with the UEs 104 or the RU 140. In some aspects, the one or more RSUs 107 may communicate with each other based on a sidelink interface.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a transmit reception point (TRP), network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in some aspects, a network coding device, such as the RSU 107, the base station 102, or the UE 104 may include an NC component 198. In some aspects, the NC component 198 may be configured to transmit a report request for reporting one or more conditions to one or more network coding devices, the one or more conditions being associated with the one or more network coding devices. In some aspects, the NC component 198 may be further configured to receive a condition report reporting the one or more conditions from the one or more network coding devices based on the report request. In some aspects, the NC component 198 may be further configured to transmit a selection indication to a selected network coding device of the one or more network coding devices, the selection indication indicating a selection of the selected network coding device as an encoder for encoding a transport block (TB). In some aspects, the NC component 198 may be configured to receive a report request for reporting one or more conditions from a network node, the one or more conditions being associated with the network coding device. In some aspects, the NC component 198 may be further configured to transmit a condition report reporting the one or more conditions to the network node based on the report request. In some aspects, the NC component 198 may be further configured to receive a selection indication from the network node, the selection indication indicating a selection of the network coding device as an encoder for encoding a TB.

Figure 2:
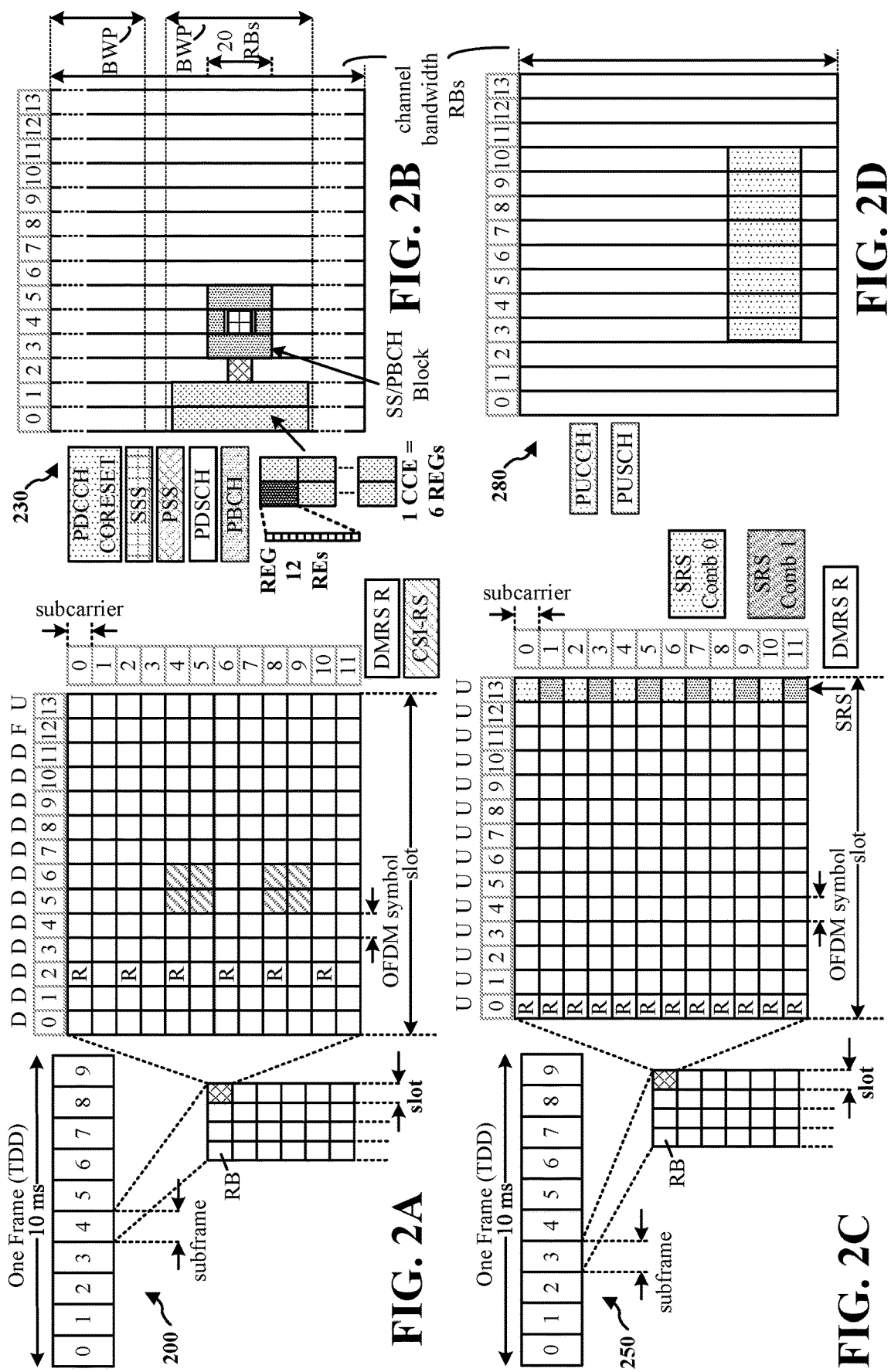
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^{\mu} \cdot 15[kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^{\mu}$ slots/subframe. The subcarrier spacing may be equal to $2^{\mu}*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 s. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
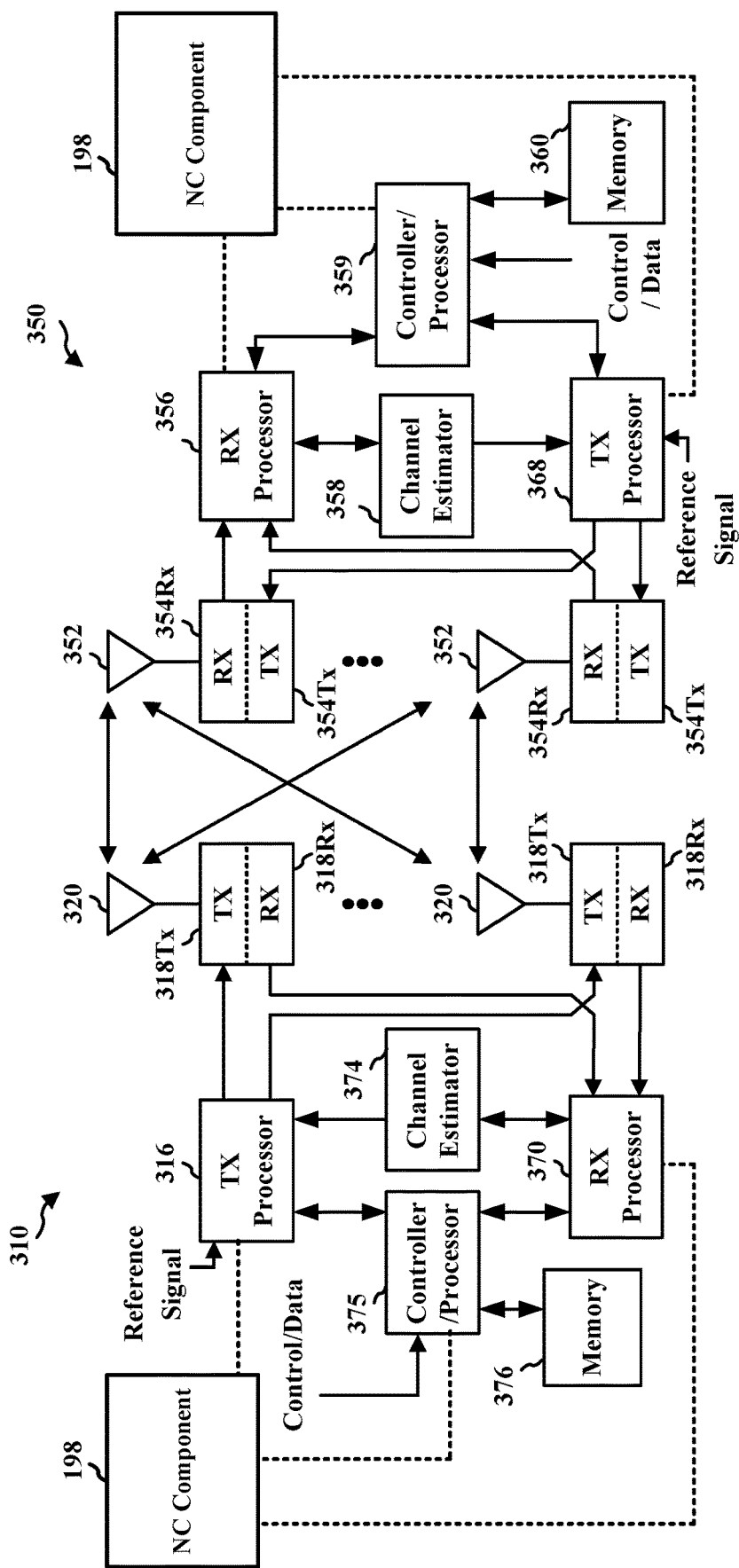
FIG. 3 is a diagram illustrating an example of a base station and network coding device (such as a road-side unit (RSU) or a user equipment (UE)) in an access network.

FIG. 3 is a block diagram of a base station 310 in communication with a network coding device 350 (such as a UE, a base station, or an RSU) in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC)

layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the network coding device 350. Each spatial stream may then be provided to a different antenna 320 via a separate transmitter 318Tx. Each transmitter 318Tx may modulate a radio frequency (RF) carrier with a respective spatial stream for transmission.

At the network coding device 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the network coding device 350. If multiple spatial streams are destined for the network coding device 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the network coding device 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with NC component 198 of FIG. 1.

At least one of the TX processor 316, the RX processor 370, and the controller/processor 375 may be configured to perform aspects in connection with NC component 198 of FIG. 1.

In some wireless communication systems, network coding (NC) may be used to increase system capacity and improve resource utilization. For example, network coding may be used for reducing the number of retransmissions in the system. Network coding may enable an increase in the number of UEs or an increase in traffic per-UE while maintaining performance. Based on network coding, after the initial transmissions, retransmissions by the original transmitter can be replaced by network coding. For example, FIG. 4A is a diagram 400 illustrating example communications between UEs without network coding. As illustrated in FIG. 4A, a UE 402A may transmit a transmission (TXa) to a UE 402C. A UE 402B may transmit a transmission (TXb) to a UE 402D. In some aspects, the UE 402A may also transmit the transmission (e.g., TXa) to the UE 402D and the UE 402B may also transmit the transmission (e.g., TXb) to the UE 402C. As one example, the transmission (e.g., TXa) from the UE 402A to the UE 402D may collide with another transmission (such as TXb), causing the transmission from the UE 402A to the UE 402D to be lost. As another example, the transmission (e.g., TXb) from the UE 402B to the UE 402C may collide with another transmission (such as TXa), causing the transmission from the UE 402B to the UE 402C to be lost.

Figure 4B:
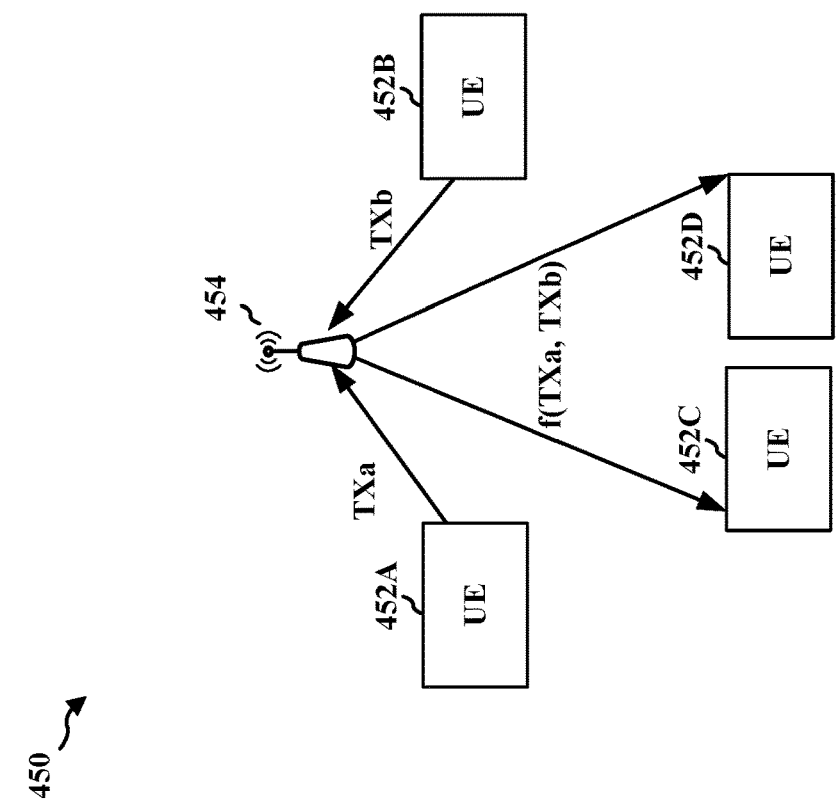
FIG. 4B is a diagram illustrating example communications between UEs and a network coding device with network coding.
Figure 4A:
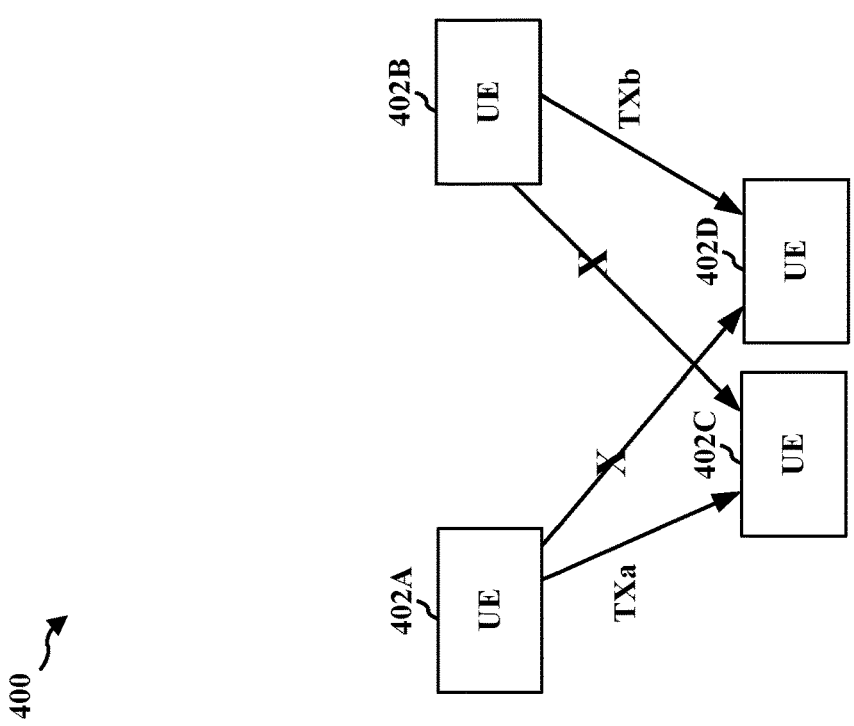
FIG. 4A is a diagram illustrating example communications between UEs without network coding.

FIG. 4B is a diagram 450 illustrating example communications between UEs and a network coding device with network coding. As illustrated in FIG. 4B, the UE 452A may transmit a transmission (e.g., TXa) to a network coding device 454 and the UE 452B may also transmit a transmission (e.g., TXb) to the network coding device 454. The network coding device 454 may be an RSU or a UE that may be able to perform network coding. After receiving the transmission (e.g., TXa) from the UE 452A and the transmission (e.g., TXb) from the UE 452B, the network coding device 454 may encode the two transmissions (e.g., TXa and TXb) into a same transmission (e.g., f(TXa, TXb)). For example, the network coding device 454 may combine packets from the two transmissions (e.g., TXa and TXb) to mix together. In some aspects, the packets from the two transmissions (e.g., TXa and TXb) may be encoded and mixed such that a number of the encoded packets in the transmission f(TXa, TXb) may be less than the total number of packets in the two transmissions. In traditional routing, packets may be stored and forwarded without a combination of packets. With network coding, transmitted data from one transmission may be encoded with other transmitted data from another transmission. A receiver may receive a combined transmission that may include the transmitted data from one transmission encoded with other transmitted data from another transmission. Different receivers or a same receiver may decode the combined transmission in different ways to decode the transmitted data from either one of the transmission.

The network coding device 454 may transmit the transmission f(TXa, TXb) to both the UE 452C and the UE 452D. The transmission f(TXa, TXb) may be decoded by the UE 452C and the UE 452D. Depending on the decoding performed by the UE 452C and the UE 452D, the two transmissions (e.g., TXa and TXb) may be both decoded based on the transmission f(TXa, TXb). Therefore, network throughput and capacity may be improved by using network coding.

In some aspects, the network coding may be based on linear coding, random network coding, erasure coding, or the like. In some aspects, erasure coding may be based on erasure codes. An erasure code may be a forward error correction code which transforms a message of k symbols into a messages with n symbols, where n and k are positive integers and n may be larger than or equal to k. In some aspects, the k symbols may be recovered by decoding the message with n symbols. For example, the k symbols may be recovered from a subset of the n symbols. In some aspects, parity check, which may be based on single parity check codes, may be performed. For example, a network coding device may receive a first message of one or more symbols collectively referred to as a, a second message of one or more symbols collectively referred to as b, and a third message of one or more symbols collectively referred to as c. An input for network coding may be [a, b, c] and the network coding device may encode the input to [a, b, c, a⊕b⊕c], which may then be transmitted in a combined transmission. The operation ⊕ may represent a direct sum. In some aspects, any single erasure may be recovered. For example, if the received vector is [a, ?, c, a⊕b⊕c], the erased element may be recovered by summing the other elements: a⊕c⊕(a⊕b⊕c)=b. In some aspects, such erasure coding may be viewed as a linear system (over a Galois field that contains a finite number of elements) with three variables and four linearly independent constraints:

$$\begin{bmatrix} 1 & 0 & 0 \\ 0 & 1 & 0 \\ 0 & 0 & 1 \\ 1 & 1 & 1 \end{bmatrix} \cdot [a \ b \ c]^T = [a \ b \ c \ a\oplus b\oplus c]^T$$

In such a linear system, any three constraints (e.g., one erasure) may be sufficient to determine the three variables.

Figure 5:
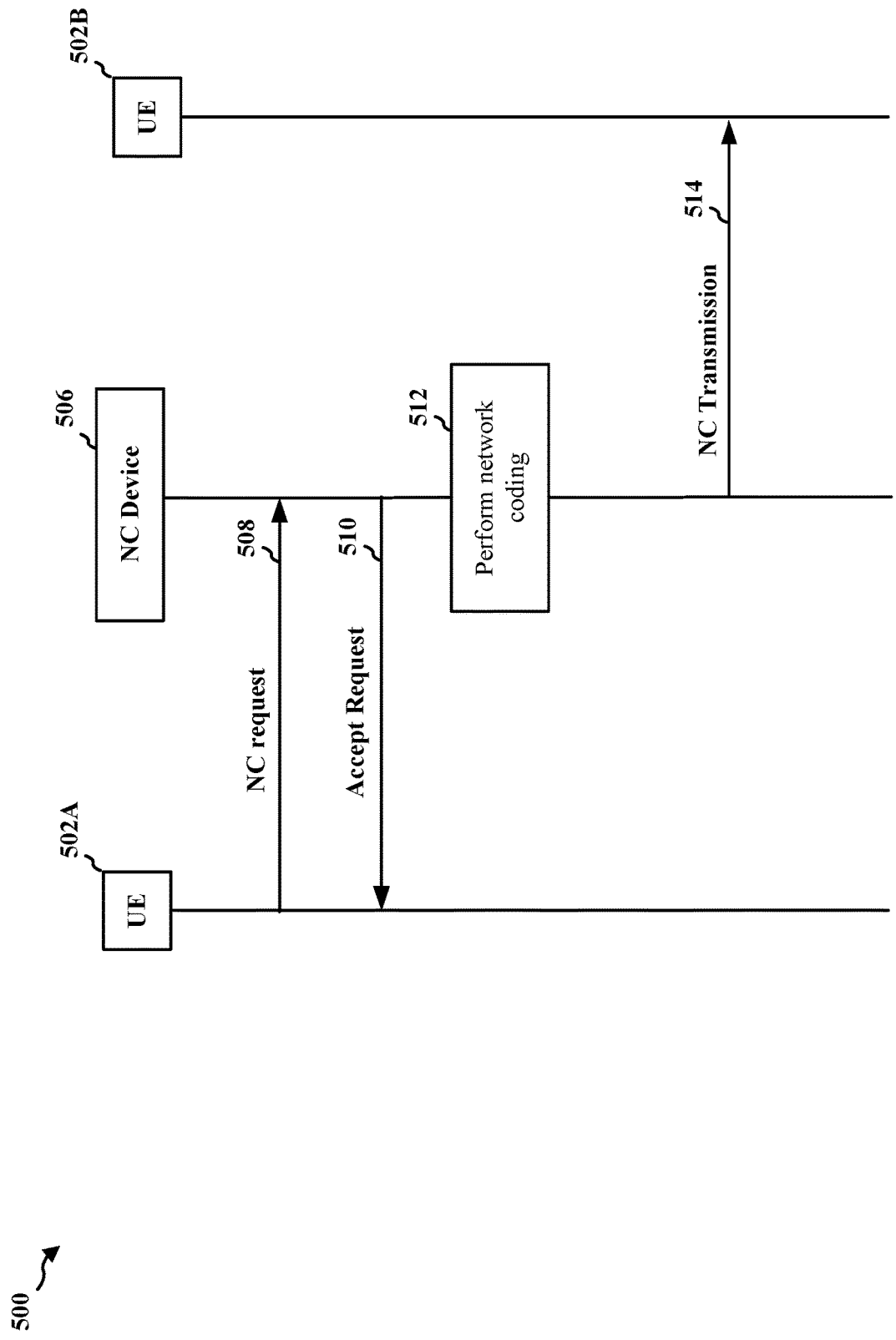
FIG. 5 is a diagram illustrating example communications between UEs and a network coding device.

FIG. 5 is a diagram 500 illustrating example communications between UEs and a network coding device. FIG. 5 illustrates an example protocol using network coding for sidelink communication. As illustrated in FIG. 5, a UE 502A may intend to transmit a TB to a UE 502B. The UE 502A may transmit the TB with a network coding request 508 to a network coding device 506. In some aspects, the network coding request 508 may be a network coding request flag. In some aspects, the network coding device 506 may be an RSU, a UE, a base station, or the like. In some aspects, the network coding device 506 may accept the network coding request 508 upon receiving the network coding request 508. In some aspects, the network coding device 506 may accept the network coding request 508 by transmitting a message indicating accept request 510 to the UE 502A. In some aspects, accepting the network coding request 508 may entail accepting encoding the TB transmitted with the network coding request 508 as part of a network coded transmission. In some aspects, after transmitting the message indicating accept request 510 to the UE 502A, the network coding device 506 may perform network coding at 512, which may be based on various coding schemes such as linear coding, random network coding, erasure coding, or the like. Performing the network coding at 512 may include encoding the TB transmitted with the network coding request 508 as part of a network coded transmission 514. In some aspects, after performing the network coding at 512, the network coding device 506 may transmit the network coded transmission 514 to the UE 502B so that the UE 502B may decode the network coded transmission 514 to recover the TB transmitted with the network coding request 508. In some aspects, one or more other TBs may be encoded in the network coded transmission 514. In some aspects, the network coding device 506 may also transmit the network coded transmission 514 to one or more other recipients associated with the one or more other TBs so that the one or more other recipients may recover the one or more other TBs upon receiving the network coded transmission 514.

Network coding may be used to increase system capacity and improve resource utilization. For example, network coding may be used for reducing the number of retransmissions in the system. Network coding may enable an increase in the number of UEs or in traffic per UE while maintaining performance. Network coding may be performed by network coding devices, such as RSUs, UEs, or base stations, based on network coding requests from devices. In some circumstances, instead of having one central network coding device responsible for perform network coding in an area, it may be beneficial to have multiple network coding device in the area to more efficiently perform network coding. However, among the network coding devices that may potentially perform network coding in the area, in some situations, a subset of the network coding devices may be more suitable for performing network coding due to having more power, more unused capability, less mobility and a longer duration of staying within the area, or the like. Aspects provided herein may enable a network coding device or a network entity to select a subset of network coding devices from a pool of network coding devices in an area as an encoder for transport blocks (TBs) for network coding.

Figure 6:
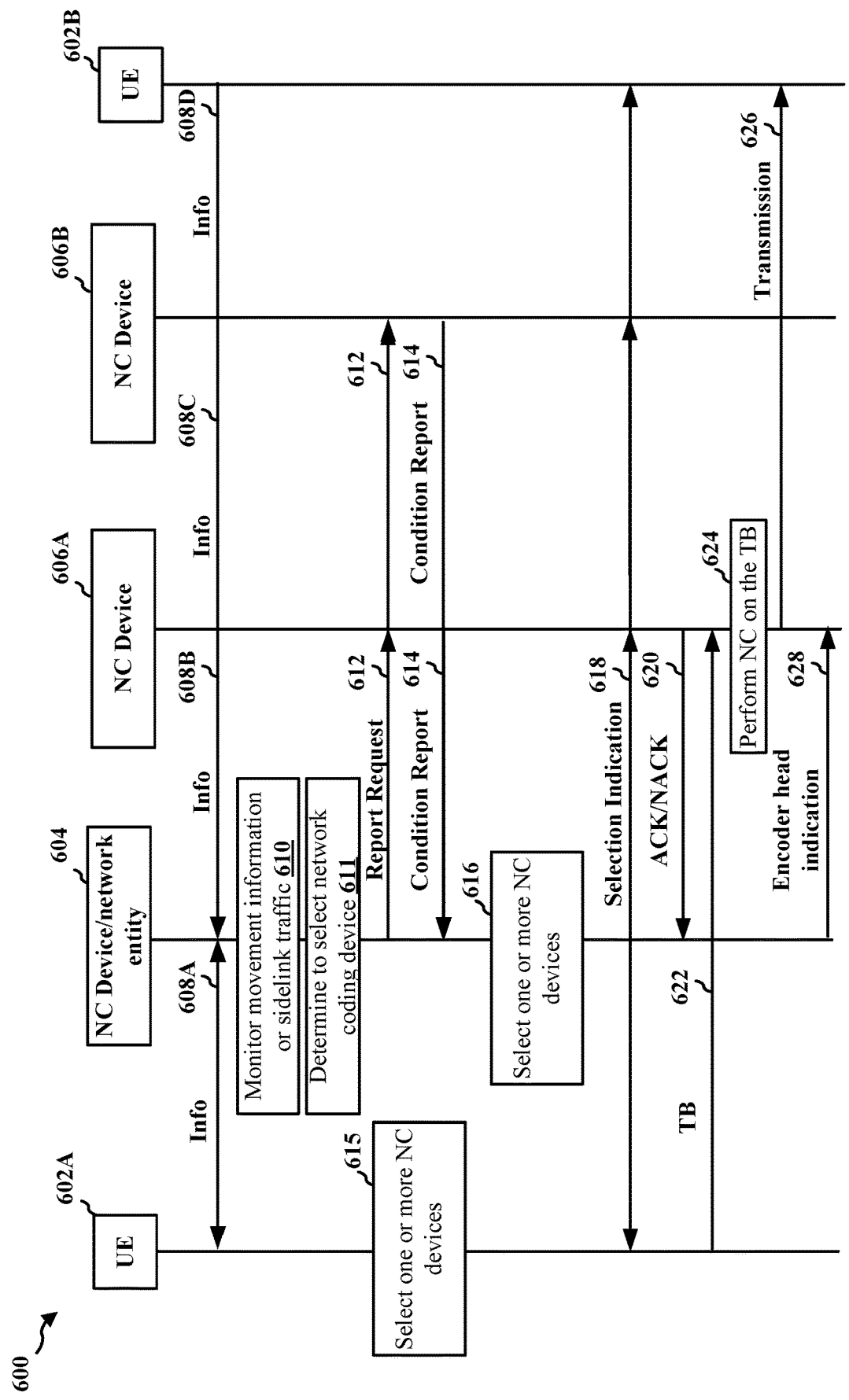
FIG. 6 is a diagram illustrating example communications between UEs, a network entity, and network coding devices.

FIG. 6 is a diagram 600 illustrating example communications between UEs 602A, a network coding device or network entity 604, and network coding devices 606A and 606B. In some aspects, the network coding device or network entity 604 may be a network node. A network node may be implemented as an aggregated base station, a disaggregated base station, an integrated access and backhaul (IAB) node, a relay node, a sidelink node, or the like. A network entity may be implemented in an aggregated or monolithic base station architecture, or alternatively, in a disaggregate d base station architecture, and may include one or more of a CU, a DU, a RU, a Near-Real Time (Near-RT) RAN Intelligent Controller (RIC), or a Non-Real Time (Non-RT) RIC. In some aspects, the network coding device 606A may be an RSU, a UE, a base station, or other devices that may be able to perform network coding. In some aspects, the network coding device 606B may be an RSU, a UE, a base station, or other devices that may be able to perform network coding.

In some aspects, at 611, the network coding device or network entity 604 may determine that there may be an insufficient number of selected encoders for network coding in an area associated with the network coding device or network entity 604. The area may be a physical area or zone that may be defined by a network associated with the network coding device or network entity 604 that the network coding device or network entity 604 is currently in. An example of the area may be an area surrounding a road intersection, such as 400m by 400m. Another example may be an area associated with a platooning of autonomous vehicles. In some aspects, the network coding device or network entity 604 may determine that there may be an insufficient number of selected encoders for network coding in an area associated with the network coding device or network entity 604 at 611 based on a variety of reasons such as a network coding encoder leaving the area, or a surge in a number of devices (e.g., UEs) in the area, or a surge in the sidelink traffic in the area. In some aspects, in order to make the determination at 611, at 610, the network coding device or network entity 604 may monitor movement information or sidelink traffic associated with one or more UEs in the area (such as the UE 602A and the UE 602B) or one or more network coding devices in the area (such as the network coding device 606A and the network coding device 606B). For example, in some aspects, the network coding device or network entity 604 may receive information 608A from the UE 602A indicating a movement of the UE 602A. In some aspects, the information 608A may be transmitted based on a PSCCH or a PSSCH upon movement of the UE 602A. In some aspects, the information 608A may include a UE identifier (ID) associated with the UE 602A, a zone identifier (ID) associated with the UE 602A (which may be a new zone ID associated with a zone into which the UE 602A is moving), global navigation satellite system (GNSS) information associated with the UE 602A, signaling traffic load related statistics associated with the UE 602A, or the like. Similarly, the network coding device or network entity 604 may also receive information 608B from the network coding device 606A, receive information 608C from the network coding device 606B, or receive information 608D from the UE 602B. Based on the received information 608A, 608B, 608C, and 608D, the network coding device or network entity 604 may make the determination at 611.

In some aspects, upon determining that there may be an insufficient number of selected encoders for network coding in the area associated with the network coding device or network entity 604, the network coding device or network entity 604 may transmit a report request 612 to one or more network coding devices in the area (such as the network coding device 606A and the network coding device 606B). The report request may be a signaling that is requesting reporting of conditions associated with selecting a network coding device. In some aspects, if the network coding device or network entity 604 is a base station, the report request 612 may be transmitted via downlink control information (DCI). In some aspects, the report request 612 may be broadcast to all network coding devices in the area. In some aspects, if the network coding device or network entity 604 is a network coding device serving as an encoder head (e.g., network coding device responsible for selecting network coding devices), the report request 612 may be transmitted via sidelink control information (SCI), such as SCI format 2 (SCI-2), a medium access control (MAC) control element (MAC-CE), a MAC header, or the like.

Upon receiving the report request 612, the network coding devices in the area (such as the network coding device 606A and the network coding device 606B) may transmit a condition report 614 to the network coding device or network entity 604. A condition report may be a report from a network coding device to a network entity or another network coding device to facilitate selection of network coding devices for network coding. The condition report 614 may include one or more of: the network coding device's GNSS location or a zone ID, movement information (such as speed or destination) associated with the network coding device, remaining battery power associated with the network coding device, whether the network coding device is connected to a power charge, whether the network coding device is already serving as a network encoder (e.g., for another area), one or more channel related statistics such as reference signal received power (RSRP) related statistics of the network coding device, RSRP related statistics of other devices, RSRP related statistics (e.g., average RSRP) of one or more other devices in a group (e.g., categorized based on a group ID), or the like. In some aspects, the condition report 614 may be transmitted via a buffer status report (BSR) or a physical uplink shared channel (PUSCH) if the network coding device or network entity 604 is a base station. In some aspects, the condition report 614 may be transmitted via a PUSCH if its size is larger than a threshold. In some aspects, the condition report 614 may be transmitted via SCI, a MAC-CE, a MAC header, or a physical sidelink shared channel (PSSCH) if the network coding device or network entity 604 is a network coding device. The condition report 614 may be transmitted via a PSSCH if its size is larger than a threshold.

In some aspects, the network coding device or network entity 604 may select one or more network coding devices (e.g., the network coding device 606A) to serve as a network coding encoder at 616 based on the received condition reports (e.g., condition report 614). In some aspects, the network coding device or network entity 604 may compute information related to the one or more network coding devices such as: 1) how long the device may stay in the area; 2) the remaining power associated with the device and whether the device is connected for charging; 3) channel performance associated with the device; 4) whether the device busy with its own traffic and potential capability remaining for network coding. Based on the computed information, the network coding device or network entity 604 may rank the one or more network coding devices and select one or more top ranked network coding devices to serve as a network coding encoder. As one example, relatively stationary, power sufficient, and more capable devices may be top ranked.

In some aspects, the configuration for a method associated with the computation and the ranking may be configured at the network coding device or network entity 604 without signaling from a network. In some aspects, the configuration for a method associated with the computation and the ranking may be configured at the network coding device or network entity 604 based on signaling from a network entity.

In some aspects, upon determining that there may be an insufficient number of selected encoders for network coding in the area associated with the network coding device or network entity 604, the network coding device or network entity 604 may not transmit a report request and may directly select one or more network coding devices (e.g., the network coding device 606A) to serve as a network coding encoder at 616.

Upon selecting one or more network coding devices (e.g., the network coding device 606A) to serve as a network coding encoder at 616, the network coding device or network entity 604 may transmit a selection indication 618 to indicate the selected network coding device. A selection indication may be a signaling for indicating a selected network coding device for network coding. In some aspects, the selection indication 618 may be transmitted based on unicast. In some aspects, the selection indication 618 may be transmitted based on broadcast. In some aspects, upon receiving the selection indication 618, the selected network coding device (e.g., the network coding device 606A) may transmit an acknowledgment (ACK) or a negative acknowledgment (NACK) 620 to the network coding device or network entity 604. In some aspects, the ACK/NACK 620 may be transmitted using uplink control information (UCI) or a scheduling request (SR). If the selected network coding device transmitted an ACK, in some aspects, a UE 602A may transmit a TB 622 to the selected network coding device (e.g., the network coding device 606A) so that the selected network coding device (e.g., the network coding device 606A) may perform network coding on the TB (e.g., at 624) and forward the TB to a destination of the TB (e.g., the UE 602B) in transmission 626.

In some aspects, under certain conditions such as expecting to leave the area or leaving a platooning group associated with the network coding device or network entity 604 (the platooning group may be a group assigned by a network that may include one or more other UEs such as UE 602A and UE 602B), the network coding device or network entity 604 may transmit an encoder head indication 628 to a network coding device (e.g., network coding device 606A), so the network coding device may be responsible for making future determinations of selecting network coding devices (e.g., similar to a responsibility of the network coding device or network entity 604 in the process described in connection with 611-618). In some aspects, platooning may be associated with autonomous vehicle (e.g., associated each UE), where some vehicles form a group and follow one another. Devices within the platooning group may be communicating with one another to share the senor data, or the like, in such a way so that it is safer for the vehicles.

In some aspects, the UE 602A may receive information from each of the network coding device 606A, the network coding device 606B, or one or more other network coding devices. The information may be broadcasted to one or more UEs and may respectively indicate that the network coding device 606A, the network coding device 606B, or one or more other network coding devices may serve as a network encoder. The information may include GNSS information associated with the network coding device 606A, the network coding device 606B, or one or more other network coding devices and one or more parameters indicating that the network coding device may serve as a network encoder (which may also include capability associated with the network coding device). The information may be transmitted via SCI, such as SCI-2, MAC-CE, MAC header or subheader, RRC message, or the like. In some aspects, at 615, the UE 602A may accordingly select one or more of the network coding device 606A, the network coding device 606B, or one or more other network coding devices to serve as network encoder for transmission or retransmission of a TB (e.g., TB 622) based on information regarding the network coding device 606A, the network coding device 606B, or one or more other network coding devices such as capability, distance (between the UE 602A and the network coding device), or the like. In some aspects, the UE 602A may choose one network coding device that is associated with a RSRP above a threshold. In some aspects, the UE 602A may choose a network coding device that covers a wider range (of the network coding device 606A, the network coding device 606B, or one or more other network coding devices) (e.g., based on distance between coding devices) that are associated with a RSRP above a threshold.

The TB (e.g., TB 622) may include one or more IDs associated with the selected network coding devices (e.g., in a header). In some aspects, the header of the TB may also include contain another ID, in addition to the packet ID and the UE ID, such that the selected encoders may use a same configuration, to collect feedback for the TB in the NC packets, using the another ID. Each TB for the packet may use one PSFCH resource for feedback. In some aspects, different IDs may be used for the same TB, if the TB is carried in different network coding packets associated with different selected network encoders. In some aspects, a same ID (e.g., the another ID) may be used for the different network coding packets and if one encoder monitors the NC packet sent from other encoders, then the encoder may compute the expected slot of feedback from the another ID.

In some aspects, the IDs of the TBs may also be included in the headers of the NC packets. In some aspects, the another ID may be computed by hashing of the packet ID and the UE ID, and all UEs and encoders may know the hashing, such that the UEs and encoders may know the another ID without having it included in the NC packet. Therefore, the feedback for a TB intended for one encoder may be understood by other encoders associated with the TB. In some aspects, the header of the TB may include information for coordinating the network coding transmissions from different encoders (two or more selected ones of the network coding device 606A, the network coding device 606B, or one or more other network coding devices) to avoid encoders from transmitting the transmission (e.g., including transmission 626) carrying the TB at a same time. For example, a sequence of transmission associated with each encoder may be included (e.g., representing which encoder may transmit first, which may transmit second, or the like). A second encoder in the sequence may not transmit the TB until the first encoder has transmitted. In some aspects, the slot ranges associated with each encoder for transmitting the TB may be included in the header. For example, a first encoder may transmit in slot $3n$, a second encoder may transmit in slot $3n+1$, a third encoder may transmit in slot $3n+2$, or the like.

Figure 7:
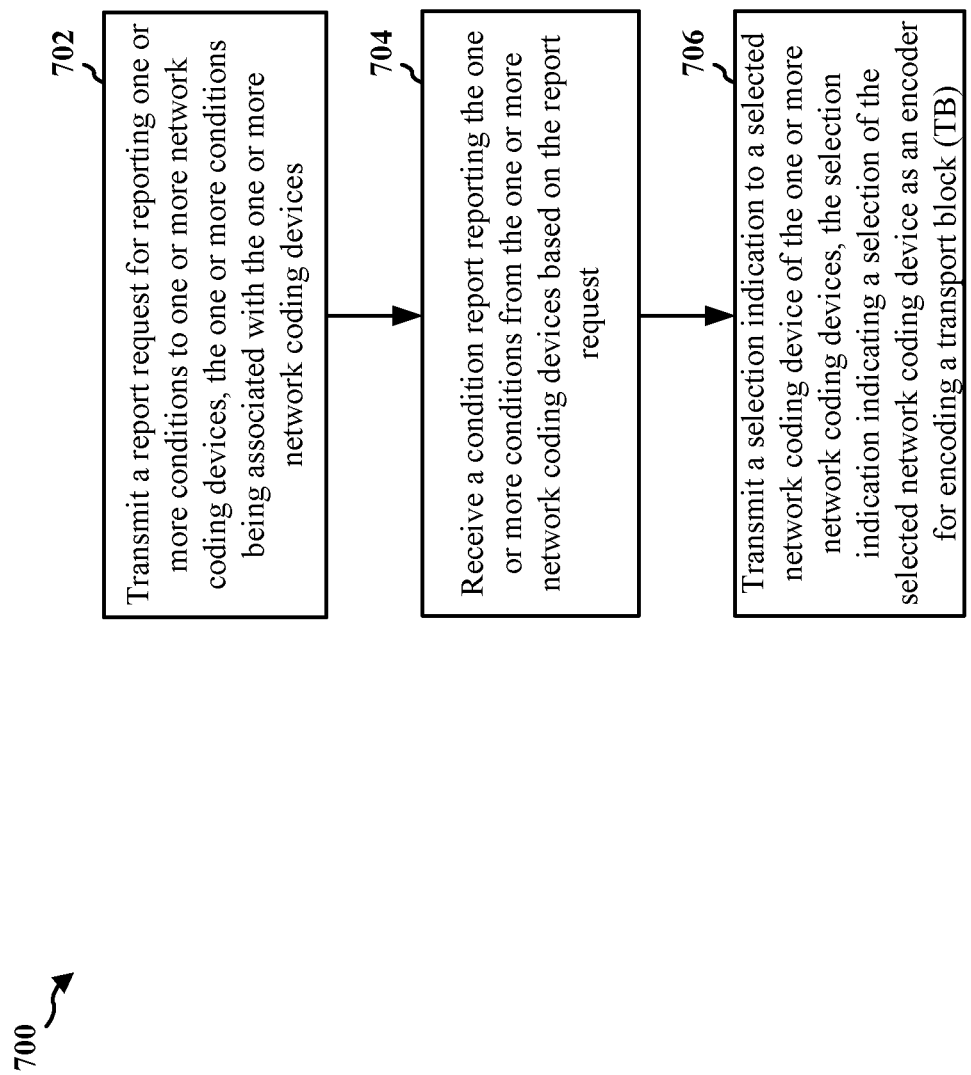
FIG. 7 is a flowchart of a method of wireless communication.

FIG. 7 is a flowchart 700 of a method of wireless communication. The method may be performed by a network node (e.g., the UE 104, the RSU 107, the base station 102, the network coding device or network entity 604; the apparatus 1004, the network entity 1002).

At 702, the network node may transmit a report request for reporting one or more conditions to one or more network coding devices, the one or more conditions being associated with the one or more network coding devices. For example, the network coding device or network entity 604 may transmit a report request 612 for reporting one or more conditions to one or more network coding devices (e.g., 606A/606B), the one or more conditions being associated with the one or more network coding devices. In some aspects, 702 may be performed by NC component 198.

At 704, the network node may receive a condition report reporting the one or more conditions from the one or more network coding devices based on the report request. For example, the network coding device or network entity 604 may receive a condition report 614 reporting the one or more conditions from the one or more network coding devices based on the report request. In some aspects, 704 may be performed by NC component 198.

At 706, the network node may transmit a selection indication to a selected network coding device of the one or more network coding devices, the selection indication indicating a selection of the selected network coding device as an encoder for encoding a TB. For example, the network coding device or network entity 604 may transmit a selection indication 618 to a selected network coding device of the one or more network coding devices, the selection indication indicating a selection of the selected network coding device as an encoder for encoding a TB. In some aspects, 706 may be performed by NC component 198.

Figure 8:
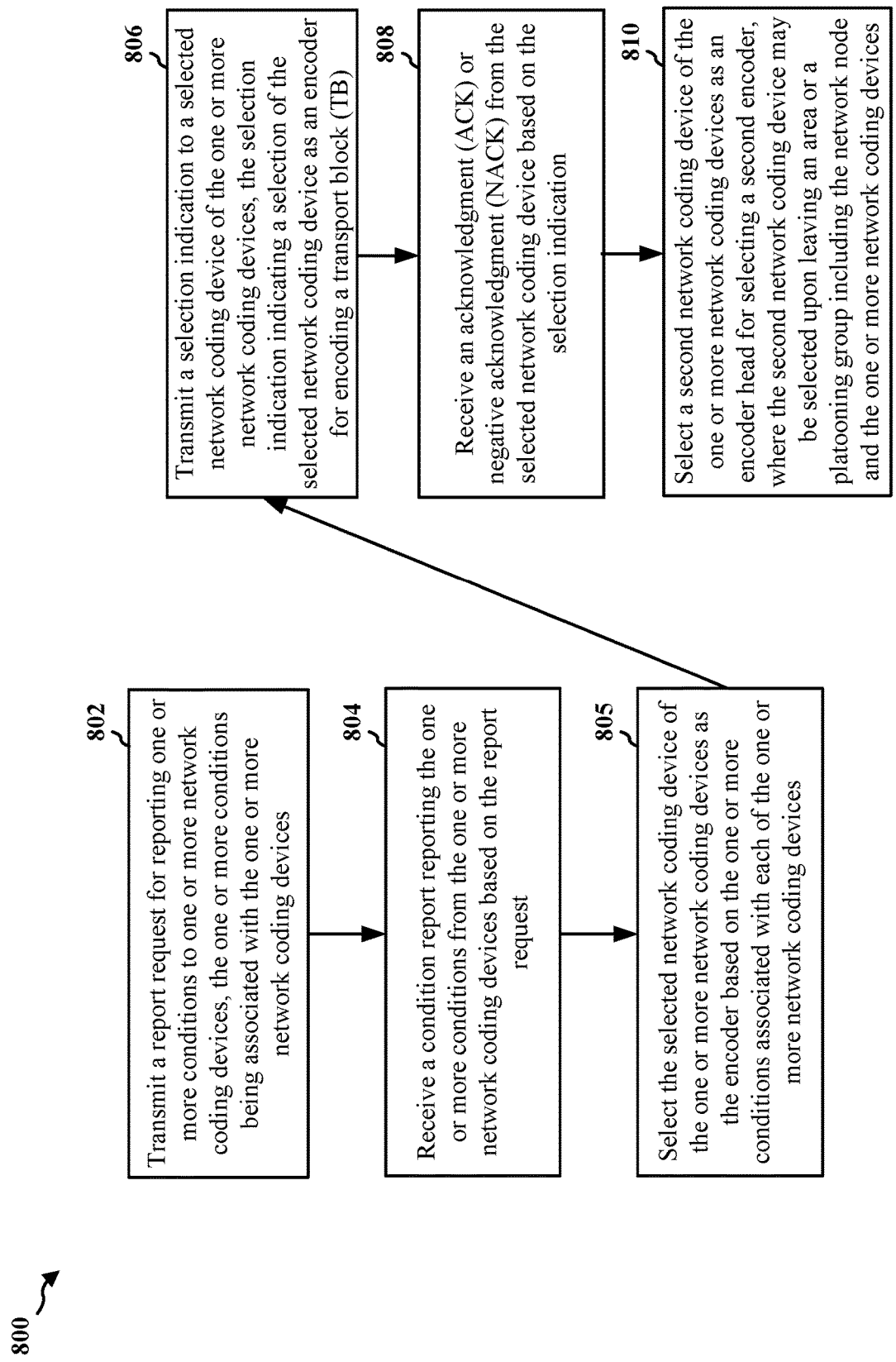
FIG. 8 is a flowchart of a method of wireless communication.

FIG. 8 is a flowchart 800 of a method of wireless communication. The method may be performed by a network node (e.g., the UE 104, the RSU 107, the base station 102, the network coding device or network entity 604; the apparatus 1004, the network entity 1002).

At 802, the network node may transmit a report request for reporting one or more conditions to one or more network coding devices, the one or more conditions being associated with the one or more network coding devices. For example, the network coding device or network entity 604 may transmit a report request 612 for reporting one or more conditions to one or more network coding devices (e.g., 606A/606B), the one or more conditions being associated with the one or more network coding devices. In some aspects, 802 may be performed by NC component 198. In some aspects, the report request may be transmitted based on a detection of an insufficient number of encoders in an area associated with the network node. In some aspects, the detection of the insufficient number of encoders may be based on one or more of: a detection of one or more encoders leaving the area, a detection of an increase in a number of wireless devices in the area, or a detection of an increase in sidelink traffic in the area. In some aspects, the network node may detect the one or more encoders leaving the area based on monitoring movement associated with the one or more encoders leaving the area; detect the increase of the number of wireless devices in the area based on monitoring the number of wireless devices in the area; or detect the increase of the sidelink traffic in the area based on monitoring the sidelink traffic in the area (e.g., based on monitoring at 610). In some aspects, the report request may be transmitted via DCI. In some aspects, the report request may be transmitted via SCI, a MAC-CE, or a MAC header.

At 804, the network node may receive a condition report reporting the one or more conditions from the one or more network coding devices based on the report request. For example, the network coding device or network entity 604 may receive a condition report 614 reporting the one or more conditions from the one or more network coding devices based on the report request. In some aspects, 804 may be performed by NC component 198. In some aspects, the condition report may be received via a BSR or a PUSCH. In some aspects, the condition report may be received via SCI, a MAC-CE, a MAC header, or a PSSCH. In some aspects, the one or more conditions may include at least one of: a GNSS location or a zone ID associated with each of the one or more network coding devices, movement information including a speed or a destination associated with each of the one or more network coding devices, a remaining power associated with each of the one or more network coding devices, a power charge indication associated with each of the one or more network coding devices, an encoder indication associated with each of the one or more network coding devices, or one or more RSRP statistics associated with each of the one or more network coding devices or a subset of the one or more network coding devices.

At 805, the network node may select the selected network coding device of the one or more network coding devices as the encoder based on the one or more conditions associated with each of the one or more network coding devices. For example, the network coding device or network entity 604 may select the selected network coding device of the one or more network coding devices as the encoder based on the one or more conditions associated with each of the one or more network coding devices at 616. In some aspects, 805 may be performed by NC component 198. In some aspects, to select the selected network coding device of the one or more network coding devices as the encoder, the network node may compute, based on the one or more conditions associated with each of the one or more network coding devices, one or more of: a duration associated with staying within an area based on the GNSS location or the zone ID, the duration associated with staying within the area based the movement information associated with each of the one or more network coding devices, a channel condition associated with each of the one or more network coding devices based on the one or more RSRP statistics, or an encoding capability associated with each of the one or more network coding devices. In some aspects, the selected network coding device may be selected based on a set of selection criteria including one or more of: the duration being above a first threshold, the channel condition being above a second threshold, the encoding capability being above a third threshold, or the power charge indication representing being connected to a power supply. In some aspects, the set of selection criteria may be received via RRC signaling. In some aspects, the channel condition may be based on RSRP and the encoding capability may be represented by a CPU utilization ratio associated with the network coding device.

At 806, the network node may transmit a selection indication to a selected network coding device of the one or more network coding devices, the selection indication indicating a selection of the selected network coding device as an encoder for encoding a TB. For example, the network coding device or network entity 604 may transmit a selection indication 618 to a selected network coding device of the one or more network coding devices, the selection indication indicating a selection of the selected network coding device as an encoder for encoding a TB. In some aspects, 806 may be performed by NC component 198.

At 808, the network node may receive an ACK or a NACK from the selected network coding device based on the selection indication. For example, the network coding device or network entity 604 may receive an ACK or a NACK 620 from the selected network coding device based on the selection indication. In some aspects, 808 may be performed by NC component 198.

At 810, the network node may select a second network coding device of the one or more network coding devices as an encoder head for selecting a second encoder, where the second network coding device may be selected upon leaving an area or a platooning group including the network node and the one or more network coding devices. For example, the network coding device or network entity 604 may select a second network coding device of the one or more network coding devices as an encoder head for selecting a second encoder and transmit an encoder head indication 628. The second network coding device may be selected upon leaving an area or a platooning group including the network node and the one or more network coding devices. In some aspects, 810 may be performed by NC component 198.

Figure 9:
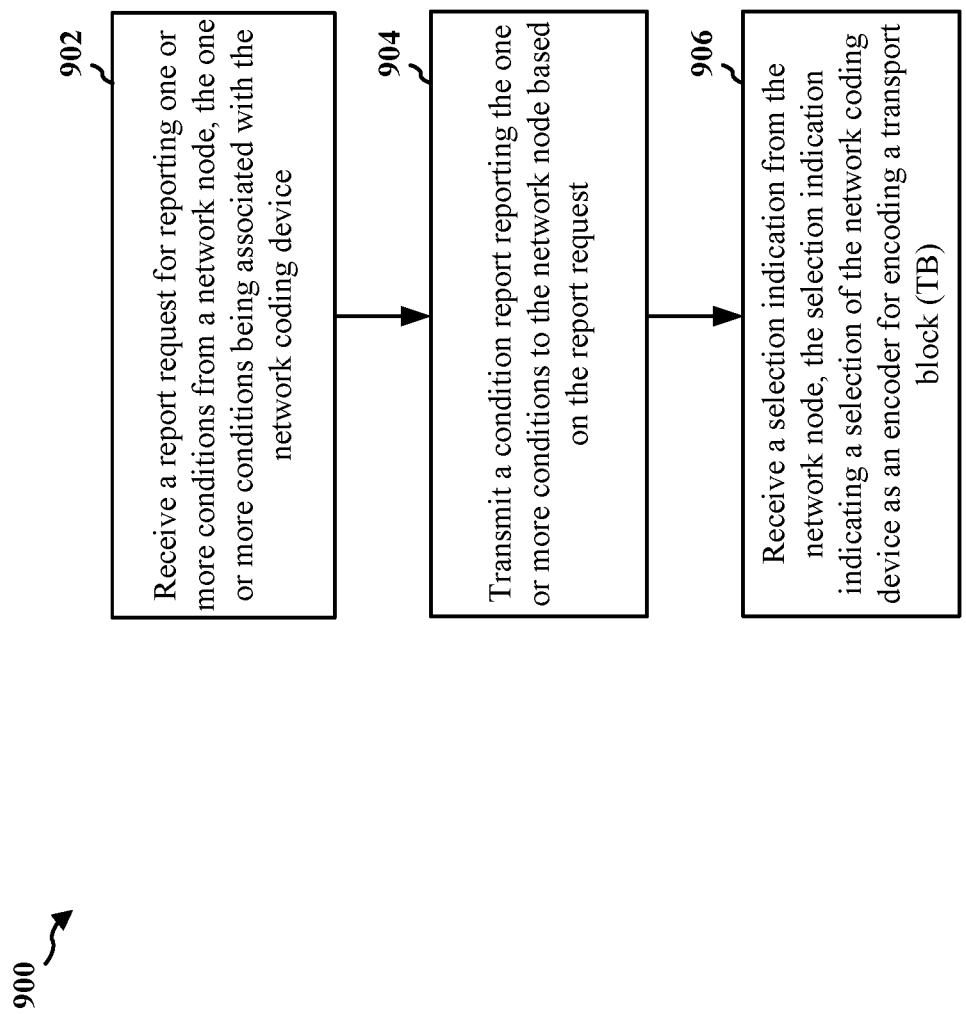
FIG. 9 is a flowchart of a method of wireless communication.

FIG. 9 is a flowchart 900 of a method of wireless communication. The method may be performed by a network coding device (e.g., the UE 104, the RSU 107, the network coding device 606A/606B; the apparatus 1004).

At 902, the network coding device may receive a report request for reporting one or more conditions from a network node, the one or more conditions being associated with the network coding device. For example, the network coding device 606A may receive a report request 612 for reporting one or more conditions from a network node (e.g., the network coding device or network entity 604), the one or more conditions being associated with the network coding device. In some aspects, 902 may be performed by NC component 198. In some aspects, the report request may be received via DCI. In some aspects, the report request may be received via SCI, a MAC-CE, or a MAC header. In some aspects, the condition report may be transmitted via a BSR or a PUSCH. In some aspects, the condition report may be transmitted via SCI, a MAC-CE, a MAC header, or a PSSCH.

At 904, the network coding device may transmit a condition report reporting the one or more conditions to the network node based on the report request. For example, the network coding device 606A may transmit a condition report 614 reporting the one or more conditions to the network node (e.g., the network coding device or network entity 604) based on the report request. In some aspects, 904 may be performed by NC component 198. In some aspects, the one or more conditions may include at least one of: a GNSS location or a zone ID associated with the network coding device, movement information including a speed or a destination associated with the network coding device, a remaining power associated with the network coding device, a power charge indication associated with the network coding device, an encoder indication associated with the network coding device, or one or more RSRP statistics associated with the network coding device.

At 906, the network coding device may receive a selection indication from the network node, the selection indication indicating a selection of the network coding device as an encoder for encoding a TB. For example, the network coding device 606A may receive a selection indication 618 from the network node (e.g., the network coding device or network entity 604), the selection indication indicating a selection of the network coding device as an encoder for encoding a TB. In some aspects, 906 may be performed by NC component 198. In some aspects, the network coding device may transmit an ACK or NACK (e.g., 620) to the network node based on the selection indication.

Figure 10:
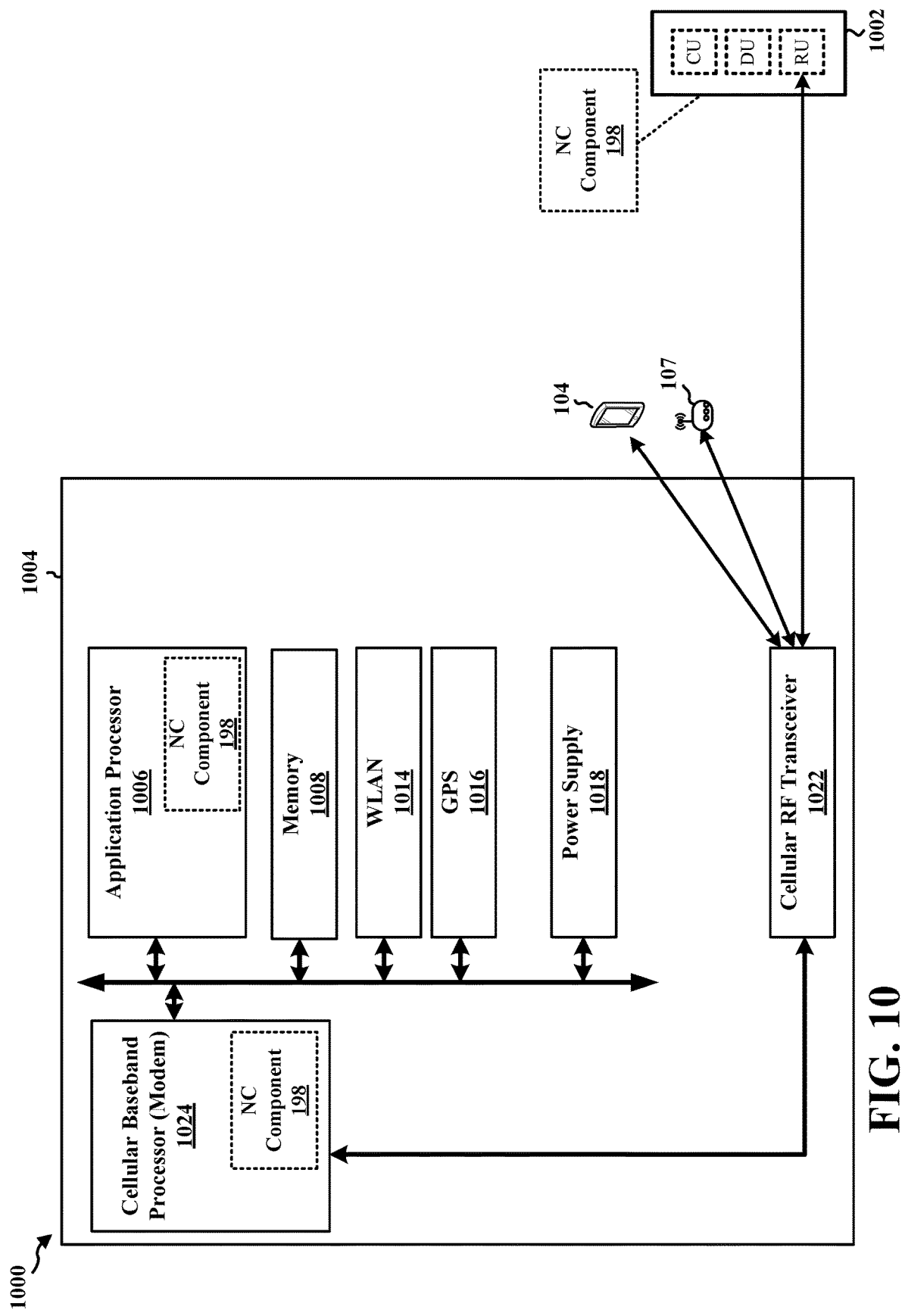
FIG. 10 is a diagram illustrating an example of a hardware implementation for an example apparatus and/or network entity.

FIG. 10 is a diagram 1000 illustrating an example of a hardware implementation for an apparatus 1004 and a network entity 1002. The apparatus 1004 may be a network node, such as a network entity (e.g., a base station) or a network coding device (such as a UE, a base station, or an RSU), a component of a network coding device, or may implement network coding device functionality. The network entity 1002 may be a BS, a component of a BS, or may implement BS functionality. In some aspects, the apparatus 1004 may include a cellular baseband processor 1024 (also referred to as a modem) coupled to a cellular RF transceiver 1022. In some aspects, the apparatus 1004 may further include an application processor 1006 coupled to a memory 1008, a wireless local area network (WLAN) module 1014, a Global Positioning System (GPS) module 1016, or a power supply 1018. The cellular baseband processor 1024 communicates through the cellular RF transceiver 1022 with the UE 104, the one or more RSUs 107, and/or with an RU associated with the network entity 1002. The RU is either part of the network entity 1002 or is in communication with the network entity 1002. The network entity 1002 may include one or more of the CU, DU, and the RU. The cellular baseband processor 1024 and the application processor 1006 may each include a computer-readable medium/memory. Each computer-readable medium/memory may be non-transitory. The cellular baseband processor 1024 and the application processor 1006 are each responsible for general processing, including the execution of software stored on the computer-readable medium/memory. The software, when executed by the cellular baseband processor 1024/application processor 1006, causes the cellular baseband processor 1024/application processor 1006 to perform the various functions described supra. The computer-readable medium/ memory may also be used for storing data that is manipulated by the cellular baseband processor 1024/application processor 1006 when executing software. The cellular baseband processor 1024/application processor 1006 may be a component of the network coding device 350 and may include the memory 360 and/or at least one of the TX processor 368, the RX processor 356, and the controller/ processor 359. In one configuration, the apparatus 1004 may be a processor chip (modem and/or application) and include just the cellular baseband processor 1024 and/or the application processor 1006, and in another configuration, the apparatus 1004 may be the entire network coding device (e.g., see 350 of FIG. 3) and include the additional modules of the apparatus 1004.

As discussed supra, in some aspects, the NC component 198 may be configured to transmit a report request for reporting one or more conditions to one or more network coding devices, the one or more conditions being associated with the one or more network coding devices. In some aspects, the NC component 198 may be further configured to receive a condition report reporting the one or more conditions from the one or more network coding devices based on the report request. In some aspects, the NC component 198 may be further configured to transmit a selection indication to a selected network coding device of the one or more network coding devices, the selection indication indicating a selection of the selected network coding device as an encoder for encoding a transport block (TB). In some aspects, the NC component 198 may be configured to receive a report request for reporting one or more conditions from a network node, the one or more conditions being associated with the network coding device. In some aspects, the NC component 198 may be further configured to transmit a condition report reporting the one or more conditions to the network node based on the report request. In some aspects, the NC component 198 may be further configured to receive a selection indication from the network node, the selection indication indicating a selection of the network coding device as an encoder for encoding a TB.

The NC component 198 may be within the cellular baseband processor 1024, the application processor 1006, or both the cellular baseband processor 1024 and the application processor 1006. The NC component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1004 may include a variety of components configured for various functions. In one configuration, the apparatus 1004, and in particular the cellular baseband processor 1024 and/or the application processor 1006, includes means for receiving a TB associated with a networking coding request from a UE. In some aspects, the apparatus 1004, and in particular the cellular baseband processor 1024 and/or the application processor 1006, may include means for transmitting a report request for reporting one or more conditions to one or more network coding devices, the one or more conditions being associated with the one or more network coding devices. The apparatus 1004 may further include means for receiving a condition report reporting the one or more conditions from the one or more network coding devices based on the report request. The apparatus 1004 may further include means for transmitting a selection indication to a selected network coding device of the one or more network coding devices, the selection indication indicating a selection of the selected network coding device as an encoder for encoding a TB. The apparatus 1004 may further include means for detecting the one or more encoders leaving the area based on monitoring movement associated with the one or more encoders leaving the area. The apparatus 1004 may further include means for detecting the increase of the number of wireless devices in the area based on monitoring the number of wireless devices in the area. The apparatus 1004 may further include means for detecting the increase of the sidelink traffic in the area based on monitoring the sidelink traffic in the area. The apparatus 1004 may further include means for selecting the selected network coding device of the one or more network coding devices as the encoder based on the one or more conditions associated with each of the one or more network coding devices. The apparatus 1004 may further include means for computing, based on the one or more conditions associated with each of the one or more network coding devices, one or more of: a duration associated with staying within an area based on the GNSS location or the zone ID, the duration associated with staying within the area based the movement information associated with each of the one or more network coding devices, a channel condition associated with each of the one or more network coding devices based on the one or more RSRP statistics, or an encoding capability associated with each of the one or more network coding devices. The apparatus 1004 may further include means for receiving an acknowledgment (ACK) or negative acknowledgment (NACK) from the selected network coding device based on the selection indication. The apparatus 1004 may further include means for selecting a second network coding device of the one or more network coding devices as an encoder head for selecting a second encoder, where the second network coding device may be selected upon leaving an area or a platooning group including the network node and the one or more network coding devices.

The means may be the component 198 of the apparatus 1004 configured to perform the functions recited by the means. As described supra, the apparatus 1004 may include the TX processor 368, the RX processor 356, and the controller/processor 359. As such, in one configuration, the means may be the TX processor 368, the RX processor 356, and/or the controller/processor 359 configured to perform the functions recited by the means.

As discussed supra, in some aspects, the NC component 198 may be configured to transmit a report request for reporting one or more conditions to one or more network coding devices, the one or more conditions being associated with the one or more network coding devices. In some aspects, the NC component 198 may be further configured to receive a condition report reporting the one or more conditions from the one or more network coding devices based on the report request. In some aspects, the NC component 198 may be further configured to transmit a selection indication to a selected network coding device of the one or more network coding devices, the selection indication indicating a selection of the selected network coding device as an encoder for encoding a transport block (TB). In some aspects, the NC component 198 may be configured to receive a report request for reporting one or more conditions from a network node, the one or more conditions being associated with the network coding device. In some aspects, the NC component 198 may be further configured to transmit a condition report reporting the one or more conditions to the network node based on the report request. In some aspects, the NC component 198 may be further configured to receive a selection indication from the network node, the selection indication indicating a selection of the network coding device as an encoder for encoding a TB.

The NC component 198 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1002 may include a variety of components configured for various functions. In one configuration, the network entity 1002 includes means for transmitting a report request for reporting one or more conditions to one or more network coding devices, the one or more conditions being associated with the one or more network coding devices. The network entity 1002 may further include means for receiving a condition report reporting the one or more conditions from the one or more network coding devices based on the report request. The network entity 1002 may further include means for transmitting a selection indication to a selected network coding device of the one or more network coding devices, the selection indication indicating a selection of the selected network coding device as an encoder for encoding a TB. The network entity 1002 may further include means for detecting the one or more encoders leaving the area based on monitoring movement associated with the one or more encoders leaving the area. The network entity 1002 may further include means for detecting the increase of the number of wireless devices in the area based on monitoring the number of wireless devices in the area. The network entity 1002 may further include means for detecting the increase of the sidelink traffic in the area based on monitoring the sidelink traffic in the area. The network entity 1002 may further include means for selecting the selected network coding device of the one or more network coding devices as the encoder based on the one or more conditions associated with each of the one or more network coding devices. The network entity 1002 may further include means for computing, based on the one or more conditions associated with each of the one or more network coding devices, one or more of: a duration associated with staying within an area based on the GNSS location or the zone ID, the duration associated with staying within the area based the movement information associated with each of the one or more network coding devices, a channel condition associated with each of the one or more network coding devices based on the one or more RSRP statistics, or an encoding capability associated with each of the one or more network coding devices. The network entity 1002 may further include means for receiving an acknowledgment (ACK) or negative acknowledgment (NACK) from the selected network coding device based on the selection indication. The network entity 1002 may further include means for selecting a second network coding device of the one or more network coding devices as an encoder head for selecting a second encoder, where the second network coding device may be selected upon leaving an area or a platooning group including the network node and the one or more network coding devices. The means may be the component 198 of the network entity 1002 configured to perform the functions recited by the means. As described supra, the network entity 1002 may include the TX processor 316, the RX processor 370, and the controller/processor 375. As such, in one configuration, the means may be the TX processor 316, the RX processor 370, and/or the controller/processor 375 configured to perform the functions recited by the means.

Figure 11:
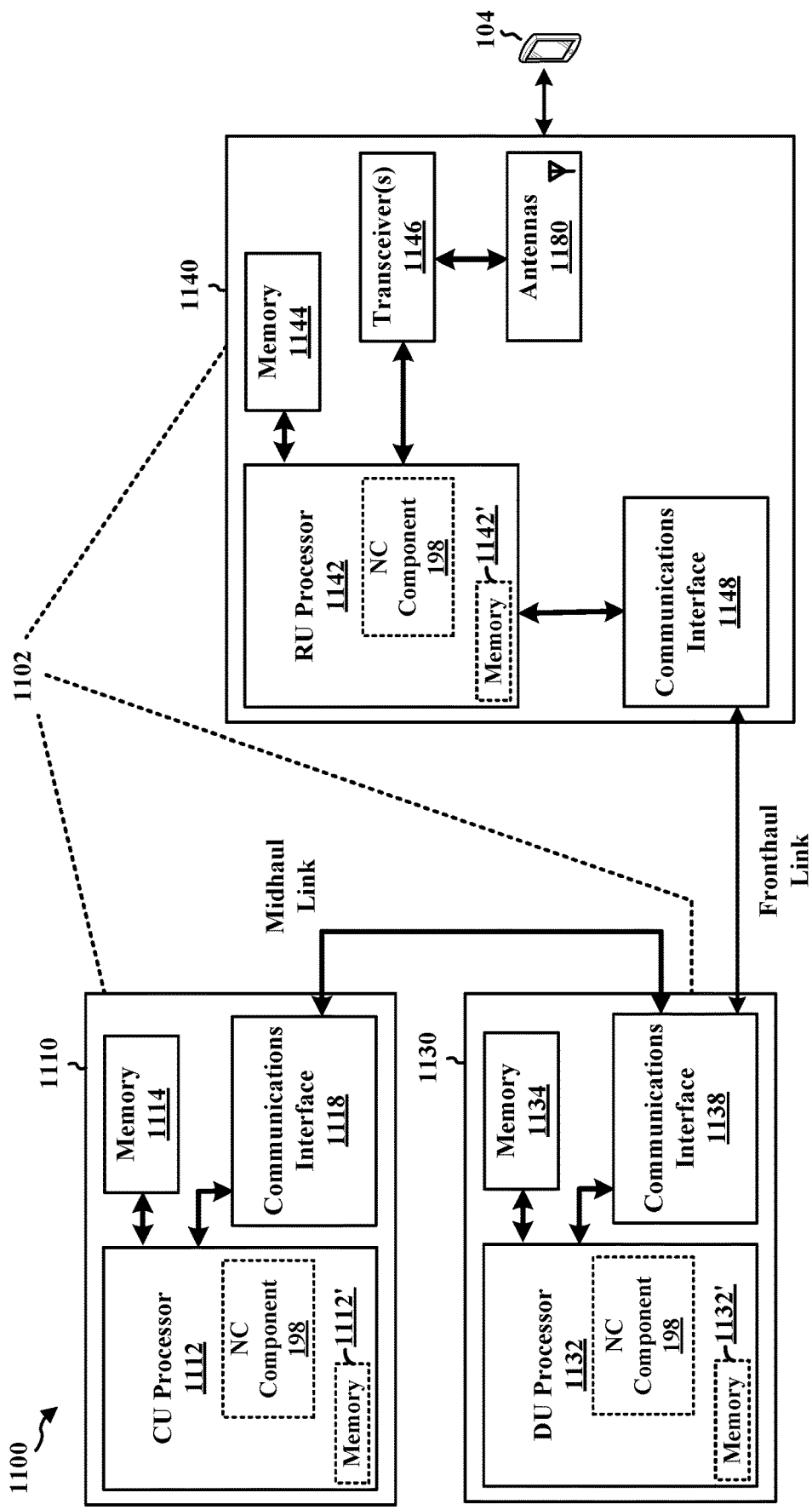
FIG. 11 is a diagram illustrating an example of a hardware implementation for an example network entity.

FIG. 11 is a diagram 1100 illustrating an example of a hardware implementation for a network entity 1102. The network entity 1102 may be a BS, a component of a BS, or may implement BS functionality. The network entity 1102 may include at least one of a CU 1110, a DU 1130, or an RU 1140. For example, depending on the layer functionality handled by the NC component 198, the network entity 1102 may include the CU 1110; both the CU 1110 and the DU 1130; each of the CU 1110, the DU 1130, and the RU 1140; the DU 1130; both the DU 1130 and the RU 1140; or the RU 1140. The CU 1110 may include a CU processor 1112. The CU processor 1112 may include on-chip memory 1112'. In some aspects, the CU 1110 may further include additional memory modules 1114 and a communications interface 1118. The CU 1110 communicates with the DU 1130 through a midhaul link, such as an F1 interface. The DU 1130 may include a DU processor 1132. The DU processor 1132 may include on-chip memory 1132'. In some aspects, the DU 1130 may further include additional memory modules 1134 and a communications interface 1138. The DU 1130 communicates with the RU 1140 through a fronthaul link. The RU 1140 may include an RU processor 1142. The RU processor 1142 may include on-chip memory 1142'. In some aspects, the RU 1140 may further include additional memory modules 1144, one or more transceivers 1146, antennas 1180, and a communications interface 1148. The RU 1140 communicates with the UE 104. The on-chip memory 1112', 1132', 1142' and the additional memory modules 1114, 1134, 1144 may each be considered a computer-readable medium/memory. Each computer-readable medium/memory may be non-transitory. Each of the processors 1112, 1132, 1142 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, in some aspects, the NC component 198 may be configured to transmit a report request for reporting one or more conditions to one or more network coding devices, the one or more conditions being associated with the one or more network coding devices. In some aspects, the NC component 198 may be further configured to receive a condition report reporting the one or more conditions from the one or more network coding devices based on the report request. In some aspects, the NC component 198 may be further configured to transmit a selection indication to a selected network coding device of the one or more network coding devices, the selection indication indicating a selection of the selected network coding device as an encoder for encoding a transport block (TB). In some aspects, the NC component 198 may be configured to receive a report request for reporting one or more conditions from a network node, the one or more conditions being associated with the network coding device. In some aspects, the NC component 198 may be further configured to transmit a condition report reporting the one or more conditions to the network node based on the report request. In some aspects, the NC component 198 may be further configured to receive a selection indication from the network node, the selection indication indicating a selection of the network coding device as an encoder for encoding a TB.

The NC component 198 may be within one or more processors of one or more of the CU 1110, DU 1130, and the RU 1140. The NC component 198 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1102 may include a variety of components configured for various functions. In one configuration, the network entity 1102 includes means for transmitting a report request for reporting one or more conditions to one or more network coding devices, the one or more conditions being associated with the one or more network coding devices. The network entity 1102 may further include means for receiving a condition report reporting the one or more conditions from the one or more network coding devices based on the report request. The network entity 1102 may further include means for transmitting a selection indication to a selected network coding device of the one or more network coding devices, the selection indication indicating a selection of the selected network coding device as an encoder for encoding a TB. The network entity 1102 may further include means for detecting the one or more encoders leaving the area based on monitoring movement associated with the one or more encoders leaving the area. The network entity 1102 may further include means for detecting the increase of the number of wireless devices in the area based on monitoring the number of wireless devices in the area. The network entity 1102 may further include means for detecting the increase of the sidelink traffic in the area based on monitoring the sidelink traffic in the area. The network entity 1102 may further include means for selecting the selected network coding device of the one or more network coding devices as the encoder based on the one or more conditions associated with each of the one or more network coding devices. The network entity 1102 may further include means for computing, based on the one or more conditions associated with each of the one or more network coding devices, one or more of: a duration associated with staying within an area based on the GNSS location or the zone ID, the duration associated with staying within the area based the movement information associated with each of the one or more network coding devices, a channel condition associated with each of the one or more network coding devices based on the one or more RSRP statistics, or an encoding capability associated with each of the one or more network coding devices. The network entity 1102 may further include means for receiving an acknowledgment (ACK) or negative acknowledgment (NACK) from the selected network coding device based on the selection indication. The network entity 1102 may further include means for selecting a second network coding device of the one or more network coding devices as an encoder head for selecting a second encoder, where the second network coding device may be selected upon leaving an area or a platooning group including the network node and the one or more network coding devices. The means may be the NC component 198 of the network entity 1102 configured to perform the functions recited by the means. As described supra, the network entity 1102 may include the TX processor 316, the RX processor 370, and the controller/processor 375. As such, in one configuration, the means may be the TX processor 316, the RX processor 370, and/or the controller/processor 375 configured to perform the functions recited by the means.

Figure 12:
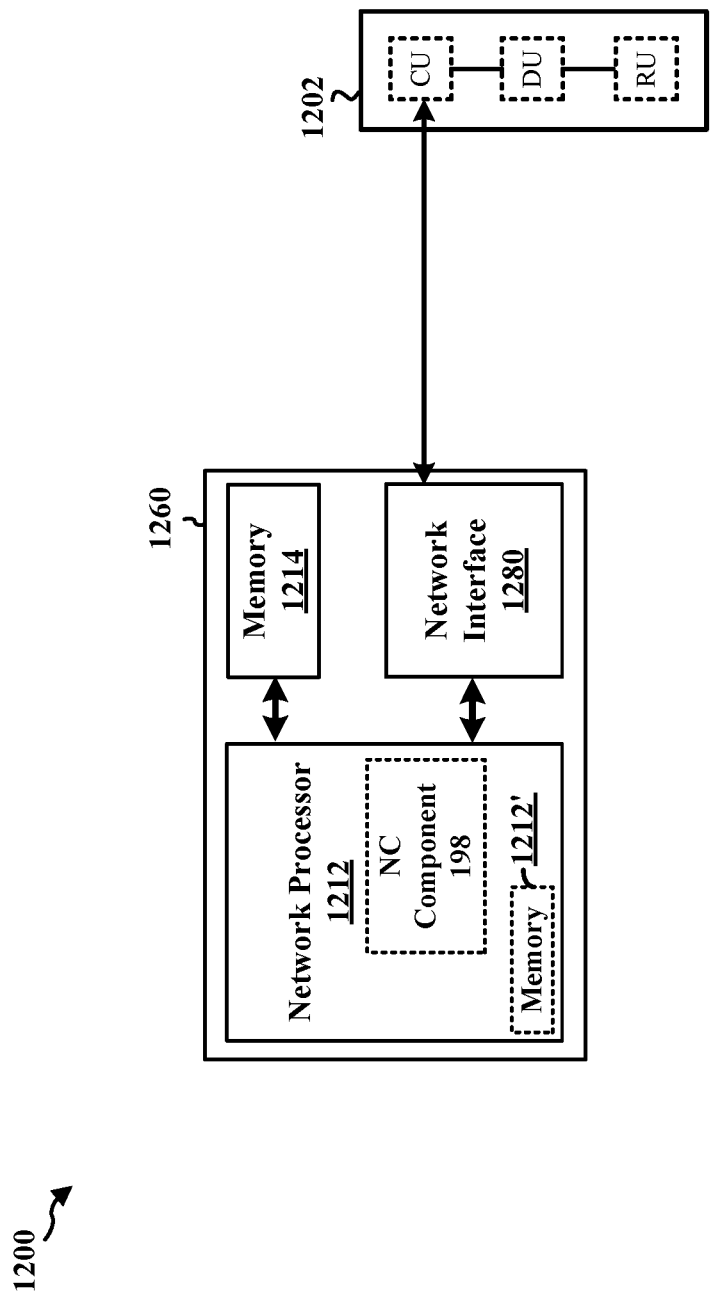
FIG. 12 is a diagram illustrating an example of a hardware implementation for an example network entity.

FIG. 12 is a diagram 1200 illustrating an example of a hardware implementation for a network entity 1260. In one example, the network entity 1260 may be within the core network 120. The network entity 1260 may include a network processor 1212. The network processor 1212 may include on-chip memory 1212'. In some aspects, the network entity 1260 may further include additional memory modules 1214. The network entity 1260 communicates via the network interface 1280 directly (e.g., backhaul link) or indirectly (e.g., through a RIC) with the CU 1202. The on-chip memory 1212' and the additional memory modules 1214 may each be considered a computer-readable medium/memory. Each computer-readable medium/memory may be non-transitory. The processor 1212 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, in some aspects, the NC component 198 may be configured to transmit a report request for reporting one or more conditions to one or more network coding devices, the one or more conditions being associated with the one or more network coding devices. In some aspects, the NC component 198 may be further configured to receive a condition report reporting the one or more conditions from the one or more network coding devices based on the report request. In some aspects, the NC component 198 may be further configured to transmit a selection indication to a selected network coding device of the one or more network coding devices, the selection indication indicating a selection of the selected network coding device as an encoder for encoding a transport block (TB). In some aspects, the NC component 198 may be configured to receive a report request for reporting one or more conditions from a network node, the one or more conditions being associated with the network coding device. In some aspects, the NC component 198 may be further configured to transmit a condition report reporting the one or more conditions to the network node based on the report request. In some aspects, the NC component 198 may be further configured to receive a selection indication from the network node, the selection indication indicating a selection of the network coding device as an encoder for encoding a TB.

The NC component 198 may be within the processor 1212. The NC component 198 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1260 may include a variety of components configured for various functions. In one configuration, the network entity 1260 includes means for transmitting a report request for reporting one or more conditions to one or more network coding devices, the one or more conditions being associated with the one or more network coding devices. The network entity 1260 may further include means for receiving a condition report reporting the one or more conditions from the one or more network coding devices based on the report request. The network entity 1260 may further include means for transmitting a selection indication to a selected network coding device of the one or more network coding devices, the selection indication indicating a selection of the selected network coding device as an encoder for encoding a TB. The network entity 1260 may further include means for detecting the one or more encoders leaving the area based on monitoring movement associated with the one or more encoders leaving the area. The network entity 1260 may further include means for detecting the increase of the number of wireless devices in the area based on monitoring the number of wireless devices in the area. The network entity 1260 may further include means for detecting the increase of the sidelink traffic in the area based on monitoring the sidelink traffic in the area. The network entity 1260 may further include means for selecting the selected network coding device of the one or more network coding devices as the encoder based on the one or more conditions associated with each of the one or more network coding devices. The network entity 1260 may further include means for computing, based on the one or more conditions associated with each of the one or more network coding devices, one or more of: a duration associated with staying within an area based on the GNSS location or the zone ID, the duration associated with staying within the area based the movement information associated with each of the one or more network coding devices, a channel condition associated with each of the one or more network coding devices based on the one or more RSRP statistics, or an encoding capability associated with each of the one or more network coding devices. The network entity 1260 may further include means for receiving an acknowledgment (ACK) or negative acknowledgment (NACK) from the selected network coding device based on the selection indication. The network entity 1260 may further include means for selecting a second network coding device of the one or more network coding devices as an encoder head for selecting a second encoder, where the second network coding device may be selected upon leaving an area or a platooning group including the network node and the one or more network coding devices. The means may be the NC component 198 of the network entity 1260 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used in this disclosure outside of the claims, the phrase "based on" is inclusive of all interpretations and shall not be limited to any single interpretation unless specifically recited or indicated as such. For example, the phrase "based on A" (where "A" may be information, a condition, a factor, or the like) may be interpreted as: "based at least on A," "based in part on A," "based at least in part on A," "based only on A," or "based solely on A." Accordingly, as disclosed herein, "based on A" may, in one aspect, refer to "based at least on A." In another aspect, "based on A" may refer to "based in part on A." In another aspect, "based on A" may refer to "based at least in part on A." In another aspect, "based on A" may refer to "based only on A." In another aspect, "based on A" may refer to "based solely on A." In another aspect, "based on A" may refer to any combination of interpretations in the alternative. As used in the claims, the phrase "based on A" shall be interpreted as "based at least on A" unless specifically recited differently.

The following aspects are illustrative only and may be combined with other aspects or teachings described herein, without limitation.

Aspect 1 is a method for communication at a network node, including: transmitting a report request for reporting one or more conditions to one or more network coding devices, the one or more conditions being associated with the one or more network coding devices; receiving a condition report reporting the one or more conditions from the one or more network coding devices based on the report request; and transmitting a selection indication to a selected network coding device of the one or more network coding devices, the selection indication indicating a selection of the selected network coding device as an encoder for encoding a transport block (TB).

Aspect 2 is the method of aspect 1, where the report request may be transmitted based on a detection of an insufficient number of encoders in an area associated with the network node.

Aspect 3 is the method of any of aspects 1-2, where the detection of the insufficient number of encoders may be based on one or more of: a detection of one or more encoders leaving the area, a detection of an increase in a number of wireless devices in the area, or a detection of an increase in sidelink traffic in the area.

Aspect 4 is the method of any of aspects 1-3, further including: detecting the one or more encoders leaving the area based on monitoring movement associated with the one or more encoders leaving the area; detecting the increase of the number of wireless devices in the area based on monitoring the number of wireless devices in the area; or detecting the increase of the sidelink traffic in the area based on monitoring the sidelink traffic in the area.

Aspect 5 is the method of any of aspects 1-4, where the report request may be transmitted via downlink control information (DCI).

Aspect 6 is the method of any of aspects 1-5, where the report request may be transmitted via sidelink control information (SCI), a medium access control (MAC) control element (CE) (MAC-CE), or a MAC header.

Aspect 7 is the method of any of aspects 1-6, where the condition report may be received via a buffer status report (BSR) or a physical uplink shared channel (PUSCH).

Aspect 8 is the method of any of aspects 1-7, where the condition report may be received via sidelink control information (SCI), a medium access control (MAC) control element (CE) (MAC-CE), a MAC header, or a physical sidelink shared channel (PSSCH).

Aspect 9 is the method of any of aspects 1-8, where the one or more conditions include at least one of: a global navigation satellite system (GNSS) location or a zone identifier (ID) associated with each of the one or more network coding devices, movement information including a speed or a destination associated with each of the one or more network coding devices, a remaining power associated with each of the one or more network coding devices, a power charge indication associated with each of the one or more network coding devices, an encoder indication associated with each of the one or more network coding devices, or one or more reference signal received power (RSRP) statistics associated with each of the one or more network coding devices or a subset of the one or more network coding devices.

Aspect 10 is the method of aspect 9, further including: selecting the selected network coding device of the one or more network coding devices as the encoder based on the one or more conditions associated with each of the one or more network coding devices.

Aspect 11 is the method of any of aspects 1-10, selecting the selected network coding device of the one or more network coding devices as the encoder may include computing, based on the one or more conditions associated with each of the one or more network coding devices, one or more of: a duration associated with staying within an area based on the GNSS location or the zone ID, the duration associated with staying within the area based the movement information associated with each of the one or more network coding devices, a channel condition associated with each of the one or more network coding devices based on the one or more RSRP statistics, or an encoding capability associated with each of the one or more network coding devices.

Aspect 12 is the method of any of aspects 1-11, where the selected network coding device may be selected based on a set of selection criteria including one or more of: the duration being above a first threshold, the channel condition being above a second threshold, the encoding capability being above a third threshold, or the power charge indication representing being connected to a power supply.

Aspect 13 is the method of any of aspects 1-12, where the set of selection criteria may be received via radio resource control (RRC) signaling.

Aspect 14 is the method of any of aspects 1-13, further including: receiving an acknowledgment (ACK) or negative acknowledgment (NACK) from the selected network coding device based on the selection indication.

Aspect 15 is the method of any of aspects 1-14, where the network node may be a network entity.

Aspect 16 is the method of any of aspects 1-15, where the network node may be a network coding device.

Aspect 17 is the method of any of aspects 1-16, further including: selecting a second network coding device of the one or more network coding devices as an encoder head for selecting a second encoder, where the second network coding device may be selected upon leaving an area or a platooning group including the network node and the one or more network coding devices.

Aspect 18 is a method for communication at a network coding device, including: receiving a report request for reporting one or more conditions from a network node, the one or more conditions being associated with the network coding device; transmitting a condition report reporting the one or more conditions to the network node based on the report request; and receiving a selection indication from the network node, the selection indication indicating a selection of the network coding device as an encoder for encoding a transport block (TB).

Aspect 19 is the method of aspect 18, where the report request may be received via downlink control information (DCI).

Aspect 20 is the method of any of aspects 18-19, where the report request may be received via sidelink control information (SCI), a medium access control (MAC) control element (CE) (MAC-CE), or a MAC header.

Aspect 21 is the method of any of aspects 18-20, where the condition report may be transmitted via a buffer status report (BSR) or a physical uplink shared channel (PUSCH).

Aspect 22 is the method of any of aspects 18-21, where the condition report may be transmitted via sidelink control information (SCI), a medium access control (MAC) control element (CE) (MAC-CE), a MAC header, or a physical sidelink shared channel (PSSCH).

Aspect 23 is the method of any of aspects 18-22, where the one or more conditions include at least one of: a global navigation satellite system (GNSS) location or a zone identifier (ID) associated with the network coding device, movement information including a speed or a destination associated with the network coding device, a remaining power associated with the network coding device, a power charge indication associated with the network coding device, an encoder indication associated with the network coding device, or one or more reference signal received power (RSRP) statistics associated with the network coding device.

Aspect 24 is the method of any of aspects 18-23, further including: transmitting an acknowledgment (ACK) or negative acknowledgment (NACK) to the network node based on the selection indication.

Aspect 25 is an apparatus for wireless communication at a network node including a memory and at least one processor coupled to the memory and, based at least in part on information stored in the memory, configured to perform a method in accordance with any of aspects 1-17. The apparatus may include at least one of a transceiver or an antenna coupled to the at least one processor.

Aspect 26 is an apparatus for wireless communications, including means for performing a method in accordance with any of aspects 1-17.

Aspect 27 is a non-transitory computer-readable medium including instructions that, when executed by an apparatus, cause the apparatus to perform a method in accordance with any of aspects 1-17.

Aspect 28 is an apparatus for wireless communication at a network coding device including a memory and at least one processor coupled to the memory and, based at least in part on information stored in the memory, configured to perform a method in accordance with any of aspects 18-24. The apparatus may include at least one of a transceiver or an antenna coupled to the at least one processor.

Aspect 29 is an apparatus for wireless communications, including means for performing a method in accordance with any of aspects 18-24.

Aspect 30 is a non-transitory computer-readable medium including instructions that, when executed by an apparatus, cause the apparatus to perform a method in accordance with any of aspects 18-24.

What is claimed is:

1. An apparatus for communication at a network node, comprising:
   a memory; and
   at least one processor coupled to the memory and, based at least in part on information stored in the memory, the at least one processor is configured to:
      transmit a report request for reporting one or more conditions to one or more network coding devices, the one or more conditions being associated with the one or more network coding devices;
      receive a condition report reporting the one or more conditions from the one or more network coding devices based on the report request; and
      transmit a selection indication to a selected network coding device of the one or more network coding devices, the selection indication indicating a selection of the selected network coding device as an encoder for encoding a transport block (TB).

2. The apparatus of claim 1, wherein the report request is transmitted based on a detection of an insufficient number of encoders in an area associated with the network node.

3. The apparatus of claim 2, wherein the detection of the insufficient number of encoders is based on one or more of: a detection of one or more encoders leaving the area, a detection of an increase in a number of wireless devices in the area, or a detection of an increase in sidelink traffic in the area.

4. The apparatus of claim 3, wherein the at least one processor is further configured to:
   detect the one or more encoders leaving the area based on monitoring movement associated with the one or more encoders leaving the area;
   detect the increase of the number of wireless devices in the area based on monitoring the number of wireless devices in the area; or
   detect the increase of the sidelink traffic in the area based on monitoring the sidelink traffic in the area.

5. The apparatus of claim 1, wherein the report request is transmitted via downlink control information (DCI).

6. The apparatus of claim 1, wherein the report request is transmitted via sidelink control information (SCI), a medium access control (MAC) control element (CE) (MAC-CE), or a MAC header.

7. The apparatus of claim 1, wherein the condition report is received via a buffer status report (BSR) or a physical uplink shared channel (PUSCH).

8. The apparatus of claim 1, wherein the condition report is received via sidelink control information (SCI), a medium access control (MAC) control element (CE) (MAC-CE), a MAC header, or a physical sidelink shared channel (PSSCH).

9. The apparatus of claim 1, wherein the one or more conditions comprise at least one of:
   a global navigation satellite system (GNSS) location or a zone identifier (ID) associated with each of the one or more network coding devices, movement information comprising a speed or a destination associated with each of the one or more network coding devices, a remaining power associated with each of the one or more network coding devices, a power charge indication associated with each of the one or more network coding devices, an encoder indication associated with each of the one or more network coding devices, or one or more reference signal received power (RSRP) statistics associated with each of the one or more network coding devices or a subset of the one or more network coding devices.

10. The apparatus of claim 9, wherein the at least one processor is further configured to:
   select the selected network coding device of the one or more network coding devices as the encoder based on the one or more conditions associated with each of the one or more network coding devices.

11. The apparatus of claim 10, wherein to select the selected network coding device of the one or more network coding devices as the encoder, the at least one processor is further configured to:
   compute, based on the one or more conditions associated with each of the one or more network coding devices, one or more of: a duration associated with staying within an area based on the GNSS location or the zone ID, the duration associated with staying within the area based the movement information associated with each of the one or more network coding devices, a channel condition associated with each of the one or more network coding devices based on the one or more RSRP statistics, or an encoding capability associated with each of the one or more network coding devices.

12. The apparatus of claim 11, wherein the selected network coding device is selected based on a set of selection criteria comprising one or more of: the duration being above a first threshold, the channel condition being above a second threshold, the encoding capability being above a third threshold, or the power charge indication representing being connected to a power supply.

13. The apparatus of claim 12, wherein the set of selection criteria is received via radio resource control (RRC) signaling.

14. The apparatus of claim 1, wherein the at least one processor is further configured to:
   receive an acknowledgment (ACK) or a negative acknowledgment (NACK) from the selected network coding device based on the selection indication.

15. The apparatus of claim 1, wherein the network node is a network entity.

16. The apparatus of claim 1, wherein the network node is a network coding device.

17. The apparatus of claim 16, wherein the at least one processor is further configured to:
   select a second network coding device of the one or more network coding devices as an encoder head for selecting a second encoder, wherein the second network coding device is selected upon leaving an area or a platooning group comprising the network node and the one or more network coding devices.

18. The apparatus of claim 1, further comprising at least one of a transceiver or an antenna coupled to the at least one processor.

19. An apparatus for communication at a network coding device, comprising:
- memory; and
- at least one processor coupled to the memory and configured to:
  - receive a report request for reporting one or more conditions from a network node, the one or more conditions being associated with the network coding device;
  - transmit a condition report reporting the one or more conditions to the network node based on the report request; and
  - receive a selection indication from the network node, the selection indication indicating a selection of the network coding device as an encoder for encoding a transport block (TB).

20. The apparatus of claim 19, wherein the report request is received via downlink control information (DCI).

21. The apparatus of claim 19, wherein the report request is received via sidelink control information (SCI), a medium access control (MAC) control element (CE) (MAC-CE), or a MAC header.

22. The apparatus of claim 19, wherein the condition report is transmitted via a buffer status report (BSR) or a physical uplink shared channel (PUSCH).

23. The apparatus of claim 19, wherein the condition report is transmitted via sidelink control information (SCI), a medium access control (MAC) control element (CE) (MAC-CE), a MAC header, or a physical sidelink shared channel (PSSCH).

24. The apparatus of claim 19, further comprising at least one of a transceiver or an antenna coupled to the at least one processor.

25. The apparatus of claim 19, wherein the one or more conditions comprise at least one of: a global navigation satellite system (GNSS) location or a zone identifier (ID) associated with the network coding device, movement information comprising a speed or a destination associated with the network coding device, a remaining power associated with the network coding device, a power charge indication associated with the network coding device, an encoder indication associated with the network coding device, or one or more reference signal received power (RSRP) statistics associated with the network coding device.

26. The apparatus of claim 19, wherein the at least one processor is further configured to:
- transmit an acknowledgment (ACK) or a negative acknowledgment (NACK) to the network node based on the selection indication.

27. A method for communication at a network node, comprising:
- transmitting a report request for reporting one or more conditions to one or more network coding devices, the one or more conditions being associated with the one or more network coding devices;
- receiving a condition report reporting the one or more conditions from the one or more network coding devices based on the report request; and
- transmitting a selection indication to a selected network coding device of the one or more network coding devices, the selection indication indicating a selection of the selected network coding device as an encoder for encoding a transport block (TB).

28. The method of claim 27, wherein the report request is transmitted based on a detection of an insufficient number of encoders in an area associated with the network node.

29. The method of claim 28, wherein the detection of the insufficient number of encoders is based on one or more of: a detection of one or more encoders leaving the area, a detection of an increase in a number of wireless devices in the area, or a detection of an increase in sidelink traffic in the area.

30. A method for communication at a network coding device, comprising:
- receiving a report request for reporting one or more conditions from a network node, the one or more conditions being associated with the network coding device;
- transmitting a condition report reporting the one or more conditions to the network node based on the report request; and
- receiving a selection indication from the network node, the selection indication indicating a selection of the network coding device as an encoder for encoding a transport block (TB).

* * * * *